United States Patent [19]

Matsumoto

[11] Patent Number: 5,613,142
[45] Date of Patent: Mar. 18, 1997

[54] JOIN PROCESSING SYSTEM AND METHOD FOR JOINING RELATIONS BASED ON JOIN FIELDS IN A RELATIONAL DATABASE

[75] Inventor: Toshio Matsumoto, Kanagawa, Japan

[73] Assignee: Mitsubishi Denki Kabushiki Kaisha, Tokyo, Japan

[21] Appl. No.: 388,616

[22] Filed: Feb. 14, 1995

[30]     Foreign Application Priority Data

Mar. 16, 1994 [JP] Japan .................................. 6-045620

[51] Int. Cl.⁶ .............................. G06F 7/08; G06F 7/14; G06F 7/36; G06F 12/04
[52] U.S. Cl. ................................. 395/602; 364/DIG. 1; 364/DIG. 2
[58] Field of Search .......................... 395/800, 600, 395/160, 200.07, 200.09, 650, 700; 364/DIG. 1, DIG. 2

[56]              References Cited

U.S. PATENT DOCUMENTS 4,774,657  9/1988  Anderson et al. ................... 395/600
5,193,182  3/1993  Bachman et al. .................... 395/600
5,210,870  5/1993  Baum et al. ........................ 395/600

FOREIGN PATENT DOCUMENTS 61-273633  12/1986  Japan .
3-156571   7/1991   Japan .

*Primary Examiner*—Daniel H. Pan
*Attorney, Agent, or Firm*—Wolf, Greenfield & Sacks, P.C.

[57]              ABSTRACT

This invention provides a join processing system and method, which operates efficiently without a burden to a master processor, in a relational database on a multiprocessor. In a system which includes a master processor, multiple slave processors and disk drives, data is distributed and stored in the disk drives. Each of the slave processors retrieves a first sub-table and transfers the table to the master processor, and the master processor creates a first main table. Each of the slave processors retrieves the second data selectively with reference to the first main table, and creates a second sub-table. The master processor merges the second sub-tables, and creates a second main table. Then, a join processing of the first main table and the second main table is performed.

16 Claims, 23 Drawing Sheets

FIG.2

A command to get sales amount and merchandises of employees who are Tanaka

COMMAND: select : Employee. Name , Sales. Amount , Sales. Merchandises
from Employee , Sales where Employee. Man No. = Sales. Man No.  ← JOIN CONDITION and Employee. Name like ' Tanaka %'

JOIN PROCESSING SYSTEM AND METHOD FOR JOINING RELATIONS BASED ON JOIN FIELDS IN A RELATIONAL DATABASE

BACKGROUND OF THE INVENTION

1. Field of the Invention

This invention relates to a join processing system and method which joins relations based on join fields in a relational database.

2. Description of the Related Art

FIG. 22 and FIG. 23 are block diagrams showing a related art join processing system In a relational database, which is described in Published Japanese Patent Application Hei 3-156571, for example. In FIG. 22 and FIG. 23, a master processor 1000 processes information and controls slave processors 30a–30c. Slave disk drives 40a–40c are connected to the slave processors 30a–30c, and relations 50a–50c and 60a–60c are classified and stored respectively in the slave disk drives 40a–40c in record units. Join fields F1 of the relations 50a–50c and 60a–60c are shown as 70a–70c and 80a–80c, respectively. Other join fields F2 of the relations 50a–50c are shown as 9a–9c and still other join fields F3 of the relations 60a–60c are shown as 10a–10c. Each of record addresses of the relations 50a–50c and 60a–60c is shown as 11a–11c and 12a–12c. Each of the record addresses has a number which identifies the slave processor by its first digit. Address tables 13a–13c and 14a–14c store the join fields F1 (70a–70c and 80a–80c) and the record addresses 11a–11c and 12a–12c which are retrieved from the relations 50a–50c and 60a–60c. The address tables 13a–13c and 14a–14c are sorted according to the values in the join fields F1 (70a–70c and 80a–80c). Each of the address tables 13a–13c and 14a–14c is transferred from the slave processors 30a–30c to the master processor 1000. The master processor 1000 merge-sorts the contents of the transferred address tables 13a–13c and 14a–14c in accordance with the values in the join fields F1 (70a–70c and 80a–80c), and generates each of the address tables 15 and 16. As for address tables 17a–17c and 18a–18c, the join fields F1 (70a–70c and 80a–80c) are compared with each of the address tables 15 and 16 to search record addresses of records which satisfy a join condition. The searched record addresses are sorted in accordance with numbers of the slave processors in the record addresses, and the address tables 17a–17c and 18a–18c are generated. The address tables 17a–17c and 18a–18c are transferred from the master processor 1000 to the slave processors 30a–30c. The slave processors 30a–30c search the relations 50a–50c and 60a–60c in the slave disk drives 40a–40c with reference to the record addresses 11a–11c and 12a–12c in the address tables 17a–17c and 19a - 18c. Sets of records 19a–19c and 20a–20c are read from the relations 50a–50c and 60a–60c and satisfy the join condition. As for sets of records 21 and 22, the sets of records 19a–19c and 20a–20c which satisfy the join condition in the slave processors 30a–30c are transferred to the master processor 1000 and merged to display the sets of records 21 and 22. A set of records 23 is obtained by join processing.

The join processing system and method of the related art stores the relations in the relational database in each of the slave disk drives 40a–40c, respectively, in record units. The join processing system and method retrieves the join fields of the joining relations from each of the slave disk drives 40a–40c. Then, the join fields of the joining relations are sorted in each of the slave processors. Both of the retrieve processes and the sorting processes are performed in parallel in the slave processors 30a–30c.

Therefore, in this related art system, each of the slave processors 30a–30c reads the join fields from the slave disk drives 40a–40c in parallel for each of the joining relations in the relational database, and creates address tables which consist of the record address and the join fields including the numbers of the slave processors 30a–30c. The slave processors sort the contents of the address tables In accordance with the values in the join fields and transfers the address tables to the master processor 1000. The master processor 1000 selects the record addresses of the records which satisfy the join condition based on the address tables, which are transferred from the slave processors 30a–30c, and transfers the result back to the slave processors 30a–30c. For each of the relations which are joined, each of the slave processors 30a–30c reads necessary fields in the joining records from the slave disk drives 40a–40c, according to the record addresses which are transferred from the master processor 1000. Each of the slave processors 30a–30c transfers the join fields and the sets of records, which consist of the necessary fields, to the master processor 1000. The master processor 1000 performs join processing based on the sets of records, which are transferred from slave processors 30a–30c.

In a relational database which operates in a multiprocessor join processing system of the related art, a master processor first requests data of a first table and then data of a second table to a slave processor. The master processor performs the checking of the data with a join key, discards unnecessary data, and joins the remaining data. In this system and method, the second table includes unnecessary data originally, thus resulting in a low processing efficiency.

Also, in the relational database which operates in the multiprocessor system, the master processor requests the slave processors to retrieve and transfer the join keys and record addresses of two joining tables to the master processor initially, and the master processor checks the record addresses with the join keys. The master processor requests the slave processors to retrieve necessary records and joins the retrieved records. In this related art system, all the join keys and record addresses of all the records are sent to the master processor. Therefore, the master processor has to perform the checking of all the records with the join keys.

Additionally, the master processor retrieves the table data through each of the slave processors, and performs the checking of the table data with the join key, and the master processor joins the data. Therefore, an advantage offered by the parallel operations in the slave processors is limited because of the centralized data processing of the master processor.

SUMMARY OF THE INVENTION

This invention intends to solve the above-stated problems in the join processing systems and methods of the related art. An object of this invention is to provide a join processing system and method, which includes high speed join processing in a relational database configured in a multiprocessor system.

Another object of this invention is to provide a join processing system and method which eliminates a burden to the master processor in a database which includes a master processor and multiple slave processors and in which data is distributed and stored in each of the multiple slave processors.

A further object of this invention is to provide a join processing system and method In which a data transfer volume between the master processor and the slave processors is decreased.

An additional object of this invention is to provide a join processing system and method in which the multiple slave processors perform a part of the join processing in parallel.

An even further object of this invention is to provide a join processing system and method in which the multiple slave processors perform the checking with the join key and the join processing.

According to one aspect of this invention, a join processing system joins distributed first and second data with a join key and produces a joined table. The join processing system includes:

(a) a plurality of recording elements for storing the distributed first and second data;

(b) a plurality of sub-processors, respectively coupled to the plurality of recording elements, for retrieving the first and second data and outputting the first and second data; and (c) a main processor for receiving the first and second data from the sub-processors and producing the joined table.

Each of the sub-processors reads out the first and second data from the recording elements and performs checking of a join key of the second data with a join key of the first data, selects necessary second data based on a checking result, and outputs selected data to the main processor.

According to another aspect of this invention, a join processing system joins distributed first and second data with a join key and produces a joined table. The join processing system includes:

(a) a plurality of recording elements for storing the distributed first and second data;

(b) a plurality of sub-processors, respectively coupled to the plurality of recording elements, for retrieving the first and second data and outputting the first and second data; and (c) a main processor for receiving the first and second data from the sub-processors and producing the joined table.

Each of the sub-processors reads out the first data from the recording elements, selects the second data based on the first data from the recording elements, and outputs selected second data to the main processor.

According to another aspect of this invention, a join processing system joins distributed first and second data with a join key and produces a joined table. The join processing system includes:

(a) a plurality of recording elements for storing the distributed first and second data;

(b) a plurality of sub-processors, respectively coupled to the plurality of recording elements, for retrieving the first and second data and outputting the first and second data; and (c) a main processor for receiving the first and second data from the sub-processors and producing the joined table.

Each of the sub-processors joins the first and second data, produces a partial joined table, and outputs the partial joined table to the main processor.

According to another aspect of this invention, a join processing system joins distributed first and second data with a join key and produces a joined table. The join processing system includes:

(a) a plurality of recording elements for storing the distributed first and second data;

(b) a plurality of sub-processors, respectively coupled to the plurality of recording elements, for retrieving the first and second data and outputting the first and second data; and (c) a main processor for receiving the first and second data from the sub-processors and producing the joined table.

Each of the sub-processors retrieves the first data with a join key from the recording elements and produces a first sub-table including the join key based on the first data, and transfers the first sub-table to the main processor. The main processor, receives the first sub-tables from the plurality of the sub-processors, and produces a first main table. Each of the sub-processors retrieves the second data in the recording elements with a join key included in the first main table, produces a second sub-table based on the retrieved second data, and transfers the second sub-table to the main processor. The main processor receives the second sub-table from the plurality of the sub-processors, produces a second main table, joins the first and second data based on the first and second main tables, and produces the joined table.

According to another aspect of this invention, a join processing system joins distributed first and second data with a join key and produces a joined table. The join processing system includes:

(a) a plurality of recording elements for storing the distributed first and second data;

(b) a plurality of sub-processors, respectively coupled to the plurality of recording elements, for retrieving the first and second data and outputting the first and second data; and (c) a main processor for receiving the first and second data from the sub-processors and producing the joined table;

Each of the sub-processors retrieves the first data with a join key from the recording elements and produces a first sub-table including the join key based on the retrieved first data, and transfers the first sub-table to the main processor. The main processor receives the first sub-tables from the plurality of the sub-processors, produces a first main table, calculates hash value of join keys in the first main table, produces a hash table showing an existence of the hash values and transfers the hash table to each of the sub-processors. Each of the sub-processors receives the hash table, calculates a hash value of a join key of the second data, checks the existence of the calculated hash value in the hash table, selects a second data whose hash value is confirmed to exist in the hash table, produces a second sub-table based on selected second data, and transfers the second sub-table to the main processor. The main processor receives the second sub-table from the plurality of the sub-processors, produces a second main table, joins the first and second data based on the first and second main tables, and produces the joined table.

According to another aspect of this invention, a join processing system joins distributed first and second data with a join key and produces a joined table. The join processing system includes:

(a) a plurality of recording elements for storing the distributed first and second data;

(b) a plurality of sub-processors, respectively coupled to the plurality of recording elements, for retrieving the first and second data and outputting the first and second data; and (c) a main processor for receiving the first and second data from the sub-processor and producing the joined table.

Each of the sub-processors extracts a join key of the first data and an address of the first data in the recording elements and produces a first sub-table based on the extracted join key and the address and transfers the first sub-table to the main processor. The main processor receives the first sub-tables from the plurality of the sub-processors, and produces a first main table. Each of the sub-processors refers to the first main table, compares a join key of the second data with join keys included in the first main table, selects second data whose join key is matched with one of the join keys in the first main table, produces a second sub-table based on the selected second data, and transfers the second sub-table to the main processor. The main processor receives the second sub-table from the plurality of the sub-processors, produces a second main table, joins the first and second data based on the first and second main tables, and produces the joined table.

According to the join processing system, the main processor produces a flag field corresponding to each of the first data in the first main table. Each of the sub-processors stores a comparison result in the flag field when the sub-processor compares the join key of the second data with the join keys included in the first main table to select the second data. The main processor joins the first and second data according to a comparison result stored in the flag field in the first main table.

According to another aspect of this invention, a join processing system joins distributed first and second data with a join key and produces a joined table. The join processing system includes:

(a) a plurality of recording elements for storing the distributed first and second data;

(b) a plurality of sub-processors, respectively coupled to the plurality of recording elements, for retrieving the first and second data and outputting the first and second data; and (c) a main processor for receiving the first and second data from the sub-processors and producing the joined table.

Each of the sub-processors retrieves the first data with a join key from the recording elements and produces a first sub-table including the join key based on the retrieved first data, and transfers the first sub-table to the main processor. The main processor receives the first sub-tables from the plurality of the sub-processors, produces a first main table, calculates hash values of join keys in the first main table, produces a hash table showing an existence of the hash values, and transfers the hash table to each of the sub-processors. Each of the sub-processors receives the hash table, calculates a hash value of the join key of the second data, checks the existence of the calculated hash value in the hash table, extracts a join key and an address of the second data whose hash value of the join key is confirmed to exist in the hash table, produces a second sub-table based on the extracted join key and address of the second data, and transfers the second sub-table to the main processor. The main processor receives the second sub-table from the plurality of the sub-processors, produces a second main table, joins the first and second data based on the first and second main tables, and produces the joined table.

According to another aspect of this invention, a join processing system joins distributed first and second data with a join key and produces a joined table. The join processing system includes:

(a) a plurality of recording elements for storing the distributed first and second data;

(b) a plurality of sub-processors, respectively coupled to the plurality of recording elements, for retrieving the first and second data and outputting the first and second data; and (c) a main processor for receiving the first and second data from the sub-processor and producing the joined table.

Each of the sub-processors retrieves the first data with a join key from the recording elements and produces a first sub-table including the join key based on the retrieved first data, and transfers the first sub-table to the main processor. The main processor receives the first sub-tables from the plurality of the sub-processors, produces a first main table, and transfers the first main table to each of the sub-processors. Each of the sub-processors receives the first main table, retrieves the second data in the recording elements with the join key included in the received first main table, joins the first data in the received first main table and the retrieved second data based on the join key, produces a joined sub-table, and transfers the joined sub-table to the main processor. The main processor receives the joined sub-table from the plurality of the sub-processors, and produces the joined table.

According to the join processing system, the sub-processors extract a join key and an address of the second data stored in the recording elements, compares the extracted join key of the second data with the join keys included in the first main table, extracts second data from the recording elements based on the extracted address according to the comparison result, and produces the sub-joined table.

According to the join processing system, the sub-processors include data transfer mechanism for transferring data among the sub-processors.

According to one aspect of this invention, a join processing method for joining distributed first and second data with a join key and producing a joined table, for a database system including a plurality of recording elements for storing the distributed first and second data, a plurality of sub-processors, coupled to the plurality of recording elements respectively, and a main processor for controlling the sub-processors and producing the joined table. The join processing method includes the steps of:

in each of the sub-processors, retrieving the first data with a join key from the recording elements, sorting the retrieved first data with the join key so as to produce a first sub-table, and transferring the first sub-table to the main processor;

in the main processor, receiving the first sub-table from the plurality of the sub-processors, merge-sorting the first sub-tables with the join key, and producing a first main table;

in each of the sub-processors, retrieving the second data from the recording elements, sorting the second data, extracting the second data, referring to the join key included in the first main table, so as to produce a second sub-table, and transferring the second sub-table to the main processor; and in the main processor, receiving the second sub-tables from the plurality of the sub-processors, merge-sorting the second sub-tables with the join key so as to produce a second main table, joining the first and second data based on the first and second main tables, and producing the joined table.

According to another aspect of this invention, a join processing method, for joining distributed first and second data with a join key and producing a joined table, for a database system including a plurality of recording elements for storing the distributed first and second data, a plurality of sub-processors coupled to the plurality of recording elements respectively, and a main processor for controlling the sub-processors and producing the joined table. The join processing method includes the steps of:

in each of the sub-processors, retrieving the first data with a join key from the recording elements and sorting the retrieved first data with the join key so as to produce a first sub-table, and transferring the first sub-table to the main processor;

in the main processor, receiving the first sub-tables from the plurality of the sub-processors, merge-sorting the first sub-tables with the join key so as to produce a first main table, calculating hash values of the join keys in the first main table, producing a hash table showing an existence of the hash values, and transferring the hash table to each of the sub-processors;

in each of the sub-processors, receiving the hash table, calculating a hash value of a join key of the second data, checking the existence of the calculated hash value in the hash table, selecting second data whose hash value is confirmed to exist in the hash table, sorting the selected second data so as to produce a second sub-table, and transferring the second sub-table to the main processor;

in the main processor, receiving the second sub-tables from the plurality of the sub-processors, merge-sorting the second sub-tables with the join key so as to produce a second main table, joining the first and second data based on the first and second main tables, and producing the joined table.

According to another aspect of this invention, a join processing method for joining distributed first and second data with a join key and producing a joined table, for a database system including a plurality of recording elements for storing the distributed first and second data, a plurality of sub-processors coupled to the plurality of recording elements respectively, and a main processor for controlling the sub-processors and producing the joined table. The join processing method includes the steps of:

in each of the sub-processors, extracting a join key of the first data and an address of the first data from the recording elements, sorting the extracted join keys and the addresses so as to produce a first sub-table, and transferring the first sub-table to the main processor;

in the main processor, receiving the first sub-tables from the plurality of the sub-processors, merging the first sub-tables with the join key so as to produce a first main table;

in each of the sub-processors, retrieving the second data from the recording elements, sorting the second data with the join key, comparing a join key of the second data with the join keys included in the first main table, selecting second data whose join key is matched with one of the join keys in the first main table, so as to produce a second sub-table, and transferring the second sub-table to the main processor;

in the main processor, receiving the second sub-tables from the plurality of the sub-processors, merge-sorting the second sub-tables with the join key so as to producing a second main table, joining the first and second data based on the first and second main tables and producing the joined table.

According to another aspect of this invention, a join processing method further includes the steps of:

in the main processor, producing a flag field corresponding to each of the first data in the first main table, in each of the sub-processors, storing a comparison result in the flag field when the sub-processor compares the join key of the second data with the join keys included in the first main table to select the second data;

in the main processor, joining the first and second data according to the comparison result stored in the flag field in the first main table.

According to another aspect of this invention, a join processing method for joining distributed first and second data with a join key and producing a joined table, for a database system including a plurality of recording elements for storing the distributed first and second data, a plurality of sub-processors coupled to the plurality of recording elements respectively, and a main processor for controlling the sub-processors and producing the joined table. The join processing method includes the steps of:

in each of the sub-processors, retrieving the first data with a join key from the recording elements, sorting the retrieved first data with the join key so as to produce a first sub-table, and transferring the first sub-table to the main processor;

in the main processor, receiving the first sub-tables from the plurality of the sub-processors, merge-sorting the first sub-tables with the join key so as to produce a first main table, calculating hash values of the join keys included in the first main table, producing a hash table showing an existence of the hash values, and transferring the hash table to each of the sub-processors;

in each of the sub-processors, receiving the hash table, calculating a hash value of the join key of the second data, comparing the hash value with the hash values in the hash table, extracting a join key and an address of the second data whose hash value of the join key is confirmed to exist in the hash table, sorting the extracted join keys and addresses of the second data with the join key so as to produce a second sub-table, and transferring the second sub-table to the main processor;

in the main processor, receiving the second sub-tables from the plurality of the sub-processors, merge-sorting the second sub-tables with the join key so as to produce a second main table, joining the first and second data based on the first and second main tables, and producing the joined table.

According to another aspect of this invention, a join processing method for joining distributed first and second data with a join key and producing a joined table, for a database system including a plurality of recording elements for storing the distributed first and second data, a plurality of sub-processors coupled to the plurality of recording elements respectively, and a main processor for controlling the sub-processors and producing the joined table. The join processing method includes the steps of:

in each of the sub-processors, retrieving the first data with a join key from the recording elements, sorting the retrieved first data with the join key so as to produce a first sub-table, and transferring the first sub-table to the main processor;

in the main processor, receiving the first sub-tables from the plurality of the sub-processors, merge-sorting the first sub-tables with the join key so as to produce a first main table, and transferring the first main table to each of the sub-processors;

in each of the sub-processors, receiving the first main table, retrieving the second data in the recording elements with the join key included in the received first main table, joining the first data in the received first main table and the retrieved second data based on the join key producing a joined sub-table, and transferring the joined sub-table to the main processor;

in the main processor, receiving the joined sub-tables from the plurality of the sub-processors, and merging the joined sub-tables with the join key so as to produce the joined table.

The join processing method further includes the steps of:

in each of the sub-processors, extracting a join key and an address of the second data, comparing the extracted join key of the second data with the join keys included in the first main table, retrieving second data from the recording elements based on the extracted address according to a comparison result, and producing the joined sub-table.

According to another aspect of this invention, a join processing method for joining distributed first and second data with a join key and producing a joined table, for a database system including a plurality of recording elements for storing the distributed first and second data, a plurality of sub-processors coupled to the plurality of recording elements respectively, and a main processor for controlling the sub-processors and producing the joined table. The join processing method includes the steps of:

in each of the sub-processors, retrieving the first data with a join key from the recording elements, sorting the retrieved first data with the join key so as to produce a first sub-table, dividing the first sub-table into a plurality of first sub-tables corresponding to the sub-processors, and transferring the divided first sub-tables to corresponding sub-processors;

in each of the sub-processors, receiving the divided first sub-tables from the plurality of the sub-processors, merging the divided first sub-tables with the join key so as to produce a local first main table, retrieving the second data in the recording elements with the join key included in the local first main table, transferring the retrieved second data to the sub-processors;

in the each of the sub-processors, receiving the second data from the plurality of the sub-processors, merging the received second data with the join key so as to produce a local second main table, joining the first data in the received local first main table and the produced second data based on the join key, producing a joined sub-table, and transferring the joined sub-table to the main processor;

in the main processor, receiving the joined sub-tables from the plurality of the sub-processors, and merging the joined sub-tables with the join key so as to produce the joined table.

According to one aspect of this invention, a join processing system includes:

a plurality of recording elements for storing first and second data values;

a plurality of sub-processors, respectively coupled to the plurality of recording elements, receiving and outputting the first and second data values; and a main processor, coupled to the plurality of sub-processors, receiving the first and second data values and producing a joined table.

Each of the sub-processors reads the first and second data values from a recording element and performs a comparison of a join key of the second data values with a join key of the first data values, selects data certain values of the second data values based on the comparison, and outputs the certain data values to the main processor.

According to one aspect of this invention, a method for joining first and second data values with a join key and producing a joined table includes the steps of:

in each of a plurality of sub-processors, producing a first sub-table from the first data value with a join key;

in a main processor, receiving the first sub-tables from the plurality of sub-processors and producing a first main table from the plurality of first sub-tables;

in each of the plurality of sub-processors, producing a second sub-table from the second data value with a join key; and in the main processor, receiving the second sub-tables from the plurality of sub-processors and, producing a second main-table from the second sub-tables, producing the joined table from the first and second main tables.

BRIEF EXPLANATION OF DRAWINGS

In the drawings.

FIG. 2 shows a sample of a command to explain the join processing system and method of this invention;

DESCRIPTION OF THE PREFERRED EMBODIMENTS

Embodiment 1.

Figure 1:
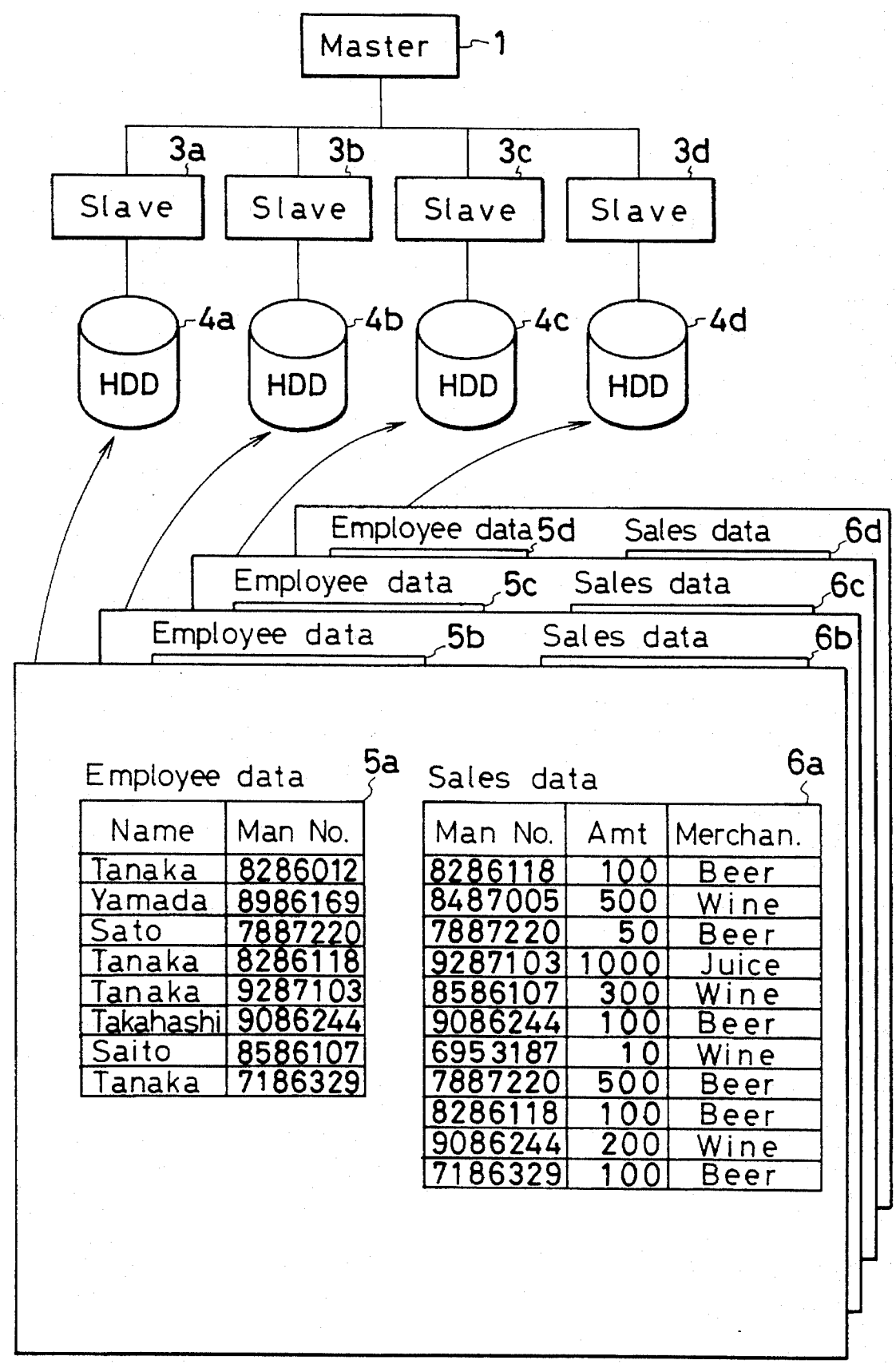
FIG. 1 shows a fundamental configuration chart of the join processing system and method of this invention.

FIG. 1 shows a system configuration chart to explain a join processing system and method of this invention. In FIG. 1, a master processor 1 is the main processor and slave processors 3a–3d are sub-processors. Disk drives 4a–4d are connected to the slave processors. Employee data 5a–5d is distributed and stored in each of the disk drives 4a–4d, and sales data 6a–6d is distributed and stored in the disk drives 4a–4d.

In embodiment 1, the system includes the master processor which processes information, the multiple slave processors which are controlled by the master processor and memories which are connected to the multiple slave processors. Each of the disk drives stores relations which are classified in record units in a relational database.

The following describes an example in which a command shown in FIG. 2 is input to the system of FIG. 1. FIG. 2 illustrates a command, which should be input to the system of FIG. 1, in order to get sales amount and merchandise of employees whose family names are Tanaka. The command is written in a database query language called SQL (Structured Query Language). However, the command may be written in database languages other than SQL. The command orders the system to retrieve employee names from the employee data and to select the sales amount and merchandise from the sales data. In this example, a condition that the employee's family names are Tanaka is given.

Furthermore, when join conditions of the employee data and the sales data are matched according to a key called a join key, the employee data and the sales data are selected and joined. In FIG. 2, the join condition is that the data is selected when man numbers of the employee data and the man numbers of the sales data are matched. The man numbers are used as the join keys to join the data.

In the following example, the man numbers are used as the join keys. An operation to check if the man numbers of the employee data and the man numbers of the sales data are matched according to the join condition is called a join key check, hereinafter.

Figure 3:
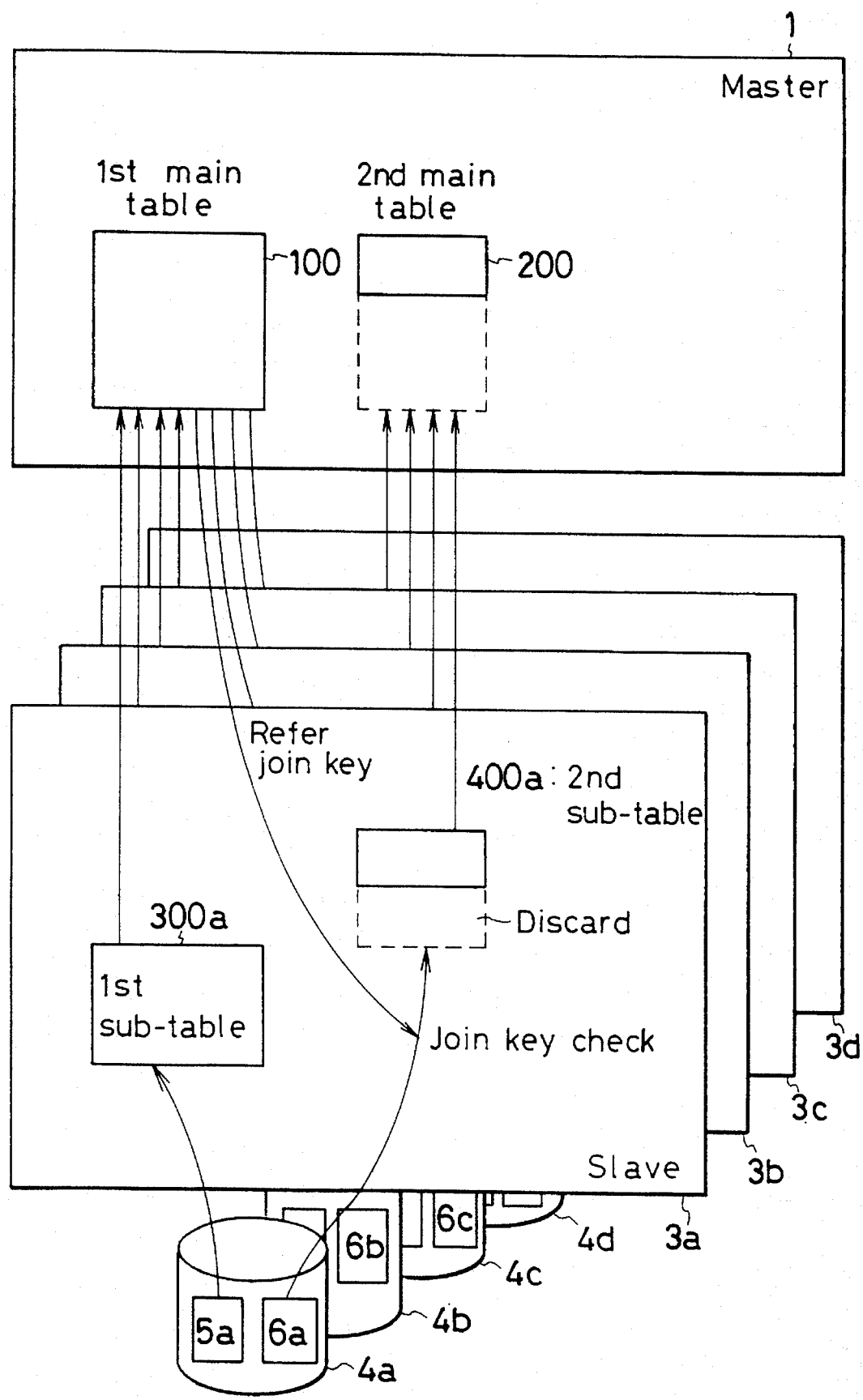
FIG. 3 shows an operation principle chart of embodiment 1 of this invention.

FIG. 3 illustrates the operation principle of embodiment 1. In FIG. 3, a first sub-table 300a is produced from the employee data 5a by the command of FIG. 2. A first main table 100 is produced by merging the first sub-tables 300a–300d, which are sent from each of the slave processors 3a–3d. A second sub-table 400a is produced from the sales data 6a with reference to the first main table 100. A second main table 200 is produced by merging the second sub-tables 400a–400d, which are transferred from the slave processors 3a–3d.

A characteristic function in this embodiment is that a number of records to be sent from the slave processors to the master processor is lessened by filtering the sales data, which is sent from the slave processors to the master processor. Practically, when the records in the first main table 100 of the master processor are already sorted in accordance with the join key, a number of retrieving records is able to be lessened by referring to the first main table 100 in the master processor in order to retrieve related data when they are retrieved from the sales data in each of the slave processors 3a–3d. As stated, in embodiment 1, the join key check is made in the slave processors instead of the main processor.

Each of the slave processors 3a–3d compares each data with each record of the sales data by referring to the join keys in the first main table of the master processor directly. Unnecessary data, whose join key is not matched, are discarded, and the second sub-tables 400a–400d are produced with the remaining matched data. Then, only the records in the second sub-tables 400a–400d are transferred to the master processor 1.

Since the join key check is made in each of the slave processors 3a–3d in parallel, the whole processing may be performed at high speed. Consequently, the data transfer volume between the master processor and the slave processors is decreased.

Figure 4:
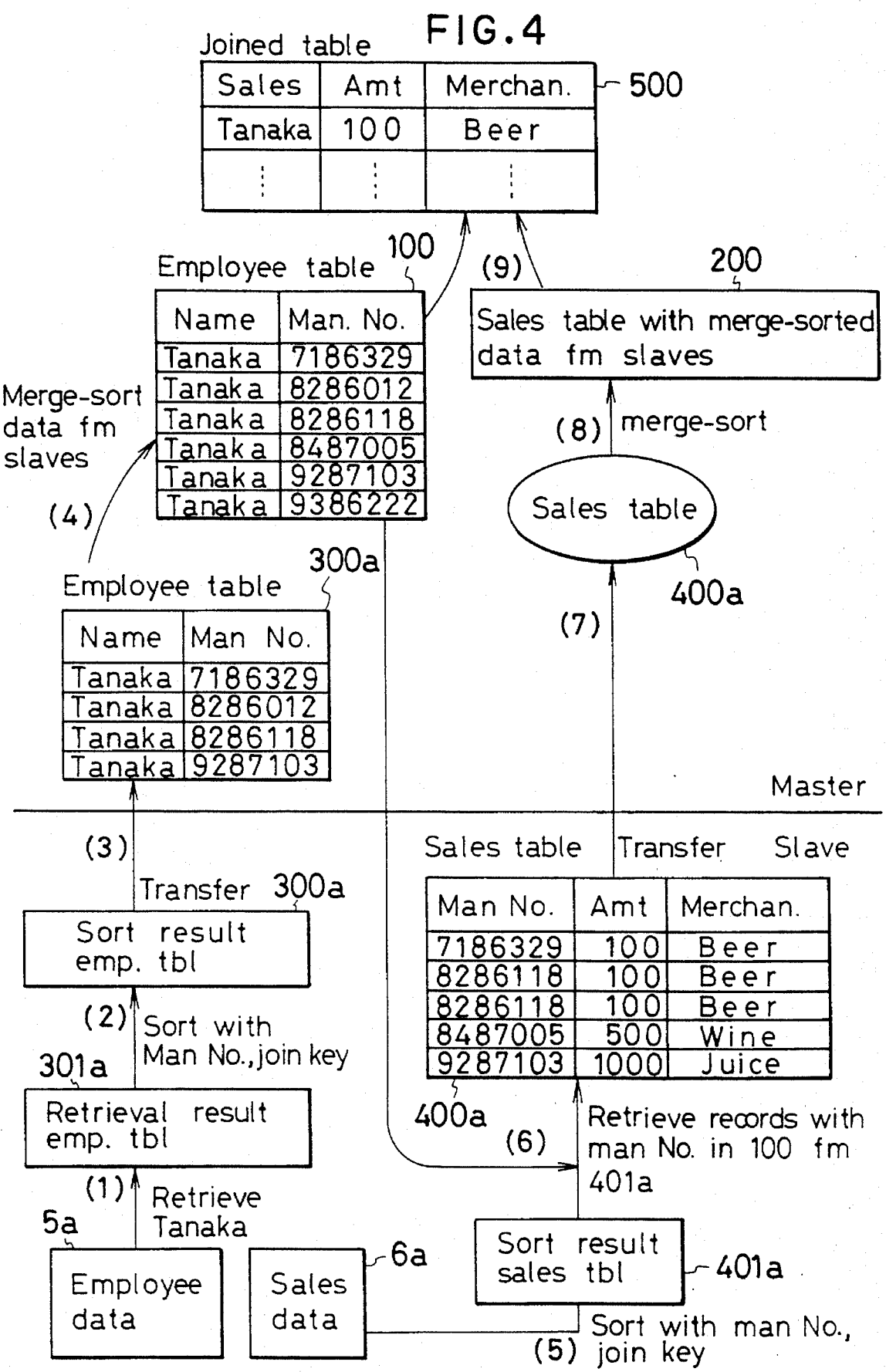
FIG. 4 shows details of embodiment 1 of this invention.

FIG. 4 illustrates the details of the operation principle, illustrated broadly in FIG. 3. In FIG. 4, steps (1)–(9) show the operation sequence. The following explanation is made in this order.

(1) Employees whose family names are Tanaka are retrieved from the employee data 5a. Names and man numbers of the employees, whose family names are Tanaka, are retrieved. The retrieved names and man numbers are stored in a retrieval result employee table 301a.

(2) The content of the retrieval result employee table 301a is sorted in accordance with the man number which is the join key, and a sort result employee table 300a is generated. The sort result employee table corresponds to the first sub-table in FIG. 3.

(3) The sort result employee table 300a is transferred to the master processor.

(4) The master processor merge-sorts the contents of the transferred employee table 300a and the employee tables 300b–300d which are transferred from other slave processors, and generates an employee table 100. The employee table 100 corresponds to the first main table in FIG. 3.

(5) In the slave processors, the sales data 6a is sorted in accordance with the man numbers which are the join keys, and a sort result sales table 401a is generated.

(6) The slave processors refer to the employee table 100 which is generated in the master processor, and retrieve records, whose man numbers appear in the employee table 100, from the sort result sales table 401a. The slave processors perform the join key checking by comparing the man numbers of the records in the table 100 with the man numbers of the records in the table 401a in sequence from the first data. After the join key check, the sales table 400a is created. The sales table 400a corresponds to the second sub-table in FIG. 3. Since the join key check of the sales table 400a is already made, only necessary data for the join processing is extracted to the sales table 400a. Hence, unnecessary data does not exist in the sales table 400a.

(7) The slave processor transfers the sales table 400a to the master processor. The master processor receives the sales table 400a.

(8) The master processor also receives the sales tables 400b–400d, which are sent from the other slave processors, and merge-sorts four received sales tables 400a–400d in accordance with the man numbers. As a result of the merge-sort operation, a sales table 200 is created. The sales table 200 corresponds to the second main table in FIG. 3.

(9) The master processor joins each record of the employee table 100 and each record of the sales table 200, and creates a joined table 500.

As stated, in embodiment 1, the employee table 100 is completed In the master processor in order to make the join key check. The slave processors refer to the completed employee table 100 in order to make the join key check. Since the join key check is made in the multiple slave processors, the join key check is able to be made in parallel simultaneously. Consequently, the processing speed is improved. At the same time, since only necessary records for the join processing exist in the sales table, only minimal records are transferred from the slave processors to the master processor.

Embodiment 2.

Figure 5:
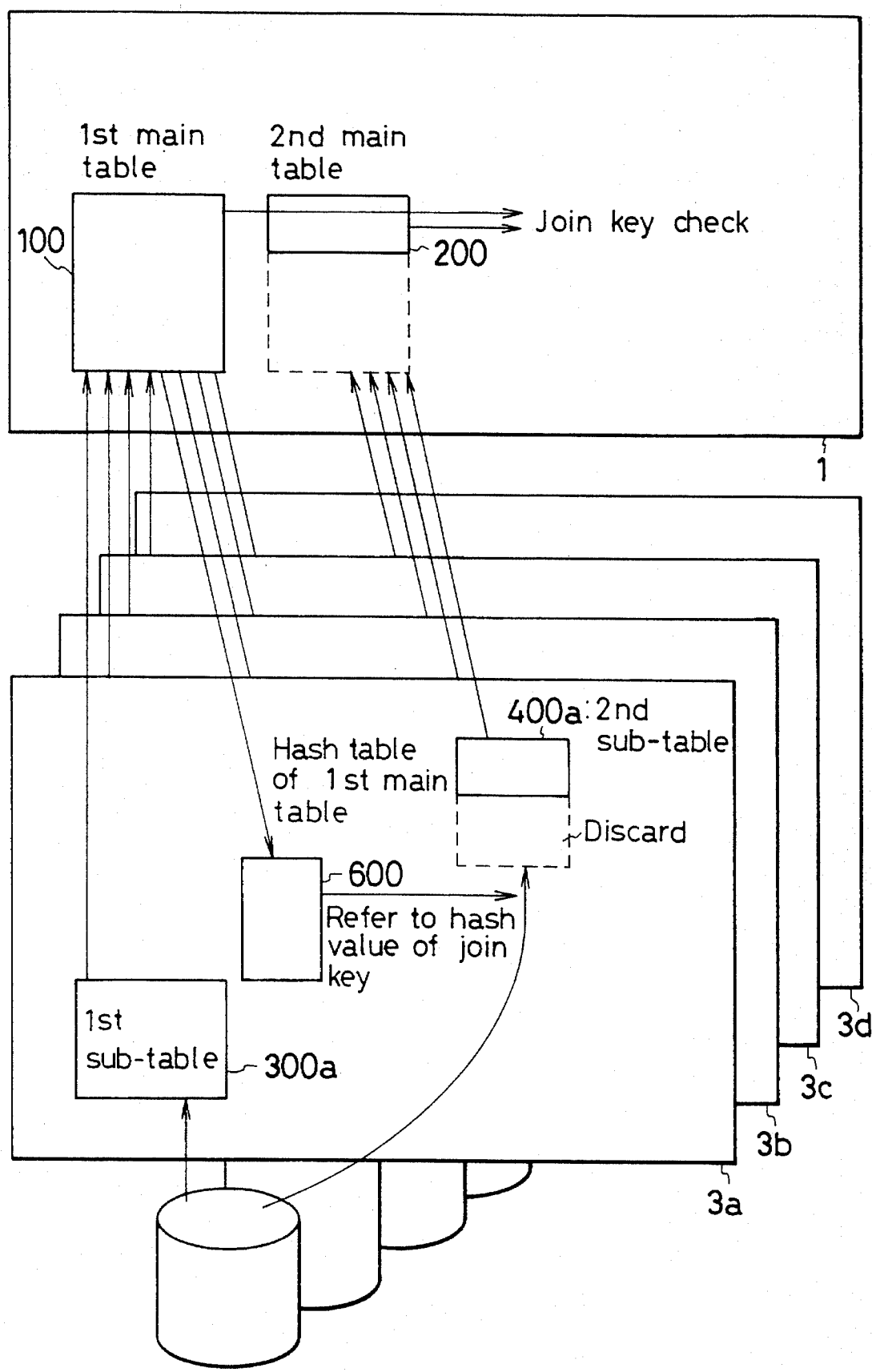
FIG. 5 shows an operation principle chart of embodiment 2 of this invention.

FIG. 5 illustrates another example of the join processing system and method according to this invention. FIG. 5 illustrates an operation principle.

With reference to FIG. 5, embodiment 2 differs from embodiment 1 in the function that a hash table 600 is created based on the Information in the first main table, after the first main table 100 is created. Hash values are calculated from the join keys in the first main table, and the hash table 600 is created. The hash table 600 is transferred from the master processor to the slave processors 3a–3d. Each of the slave processors 3a–3d refers to the transferred hash table 600, and calculates a hash value from the join key of the sales data. When the hash value is matched with one of the hash values registered in the hash table, the matched data is retrieved as a join candidate data, and the second sub-table 400a is created. In this case, data in the second sub-table which is sent from the slave processors to the main processor is filtered by using the hash table. Therefore, the number of records in the second sub-table is lessened. Since a number of records in the second sub-tables 400a–400d, which are created in the slave processors, is lessened, the merge operation of data and the join key check operation in the master processor are performed in high speed. Furthermore, the data transfer volume from the slave processors to the master processor is lessened.

Figure 6:
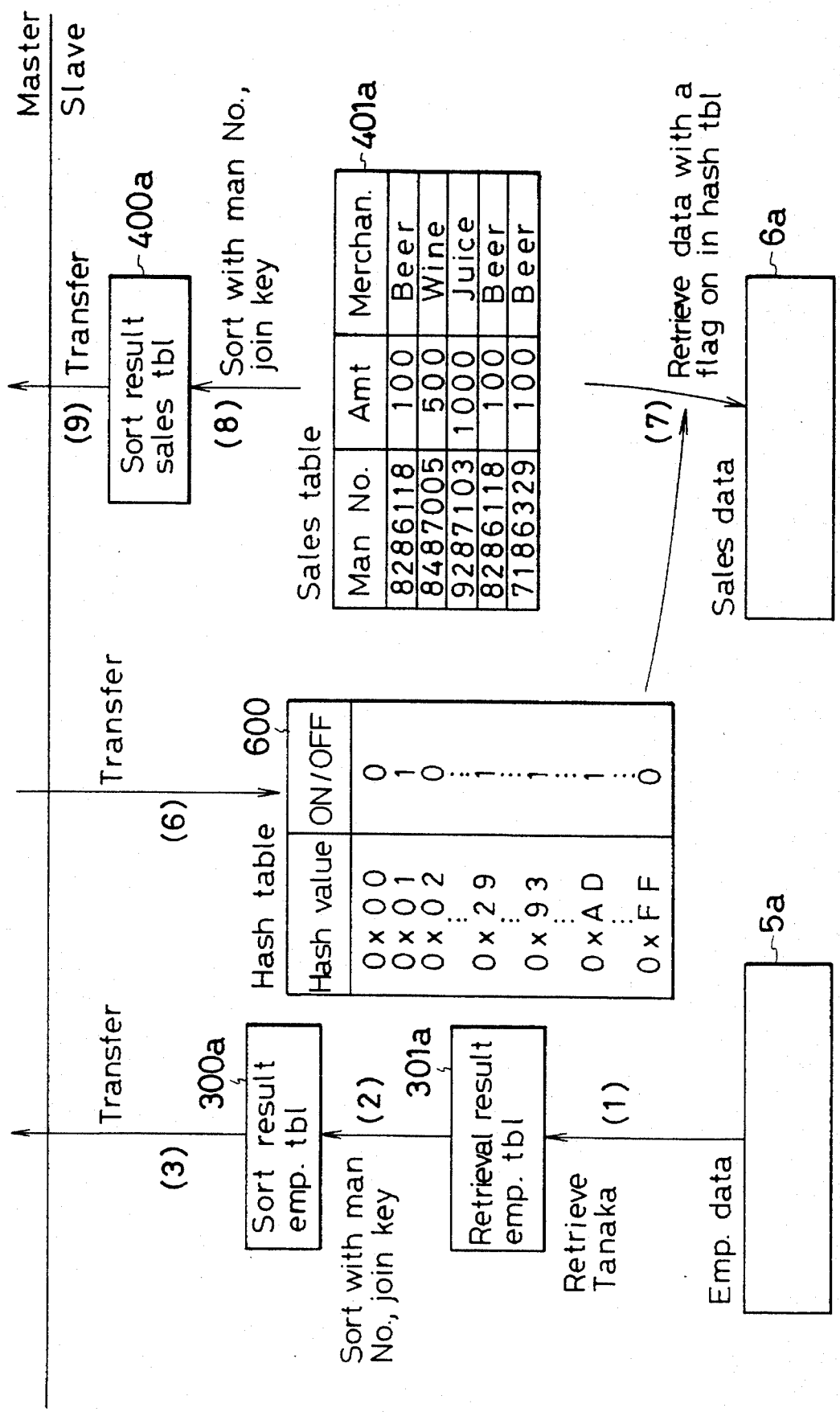
FIG. 6 illustrates an operation of the slave processor in embodiment 2 of this invention.
Figure 7:
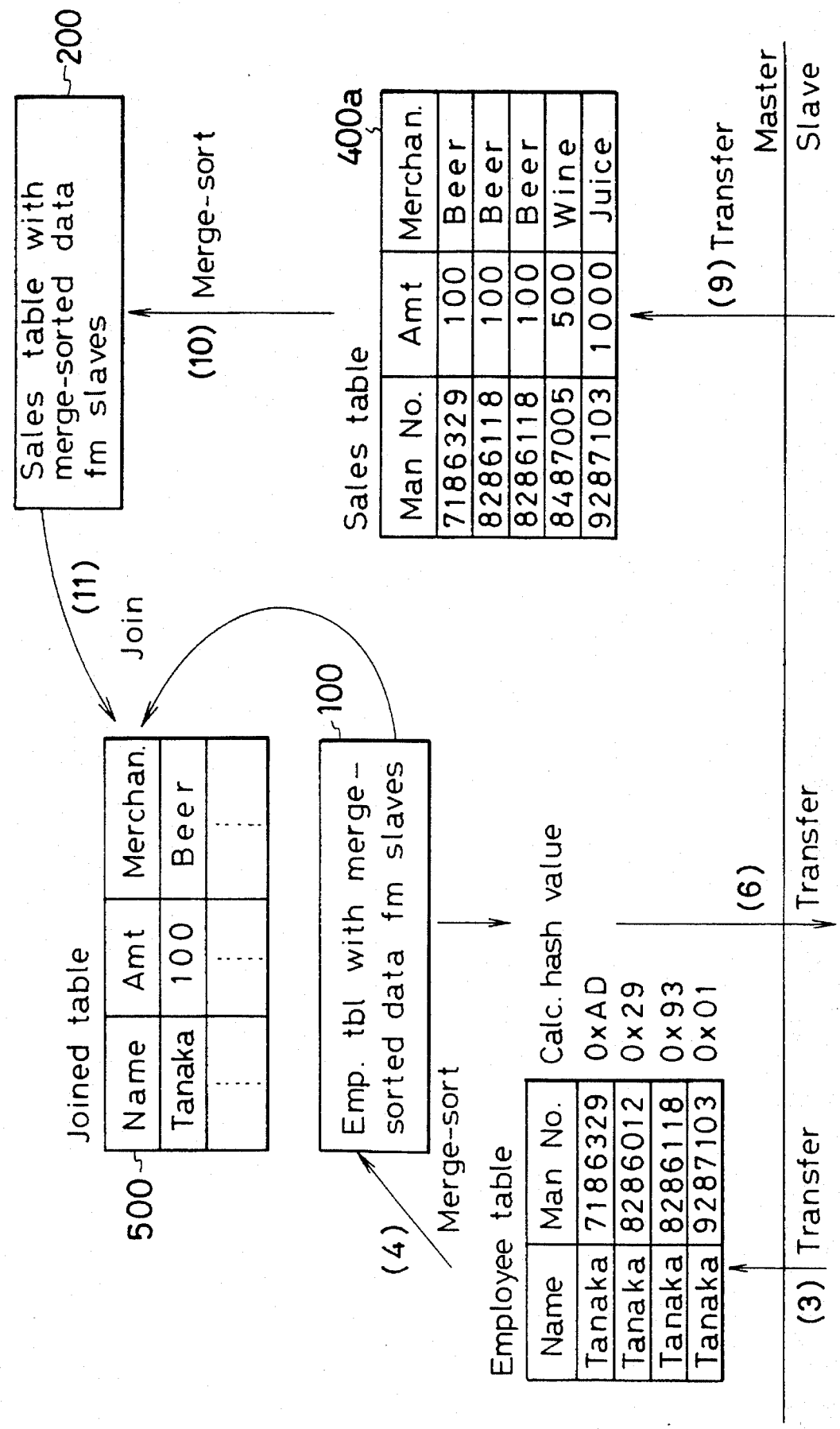
FIG. 7 illustrates an operation of the master processor in embodiment 2 of this invention.

FIG. 6 and FIG. 7 are detailed explanation charts of embodiment 2. FIG. 6 illustrates the operation of the slave processors, and FIG. 7 illustrates the operation of the master processor. In FIG. 6 and FIG. 7, steps (1)–(9) show the operation sequence. The following explanation is made in this order.

(1) Employees whose family names are Tanaka are retrieved from the employee data 5a. The retrieved data is registered in the retrieval result employee table 301a.

(2) The content of the retrieval result employee table 301a is sorted according to the man number, which is the join key. The sorting result is registered in the sort result employee table 300a. The sort result employee table 300a corresponds to the first sub-table in FIG. 5.

(3) The sort result employee table 300a is transferred to the master processor.

(4) The master processor receives the transferred employee table 300a. The master processor receives the sort result employee tables from each of the slave processors. The master processor merge-sorts the received employee tables 300a–300d in accordance with the man number, and creates the employee table 100. The employee table 100 corresponds to the first main table in FIG. 5.

Figure 8:
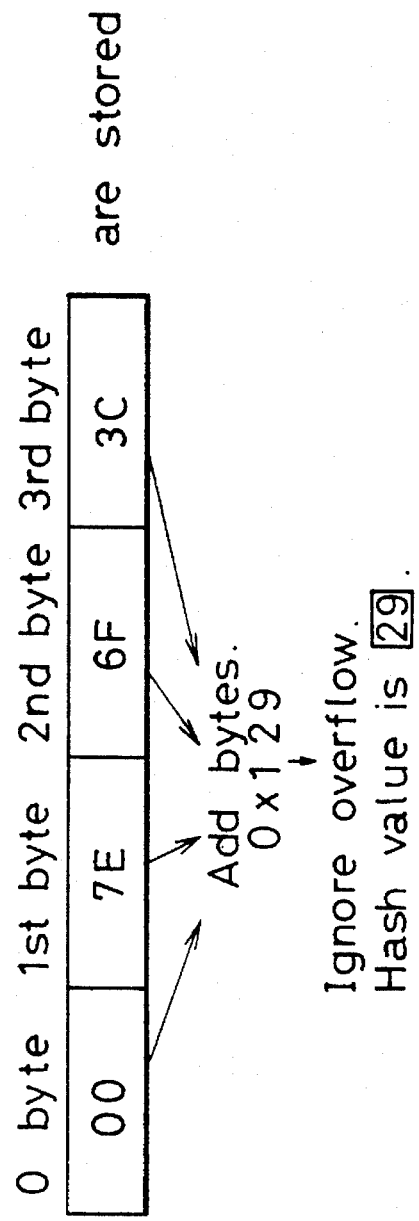
FIG. 8 shows a calculation method of a hash value in embodiment 2 of this invention.

(5) Hash values are calculated from the man number in the employee table 100. FIG. 8 illustrates a calculation method of the hash values from the man number. In this case, the man number is stored in an integer style of four bytes, and the hash value is in one byte. Four bytes of the man number are added to get one byte addition value. When an overflow occurs due to the addition, an overflown digit is ignored.

For example, man number "8286012" is "007E6F3C" in the integer style code of four bytes. "00", "7E", "6F" and "3C" are added to get "129." The first number, "1" is overflown and ignored. Therefore, the hash value is "29."

When the hash value of one byte is calculated, the hash value may be 256 kinds of numbers in total. All the man numbers are assigned to one of the hash values. The master processor calculates the hash values, and creates the hash table.

(6) The hash table, created in the master processor, is transferred to each of the slave processors 3a–3d. The hash table has 256 flags of 00 to FF. In the hash table 600 of FIG. 6, a flag of the hash value which is calculated from the employee table 100 is "1" (on), and a data corresponding to the hash value exists in the employee table 100. Other flags which correspond to other hash values are "0" (off). Therefore, information of 256 bits (information of 32 bytes) is necessary in total. When the hash table is transferred from the master processor to the slave processors, only information of 32 bytes is transferred. Therefore, influence to the system is not large.

(7) The slave processor, which has received the hash table, retrieves data from the sales data 6a by referring to the hash table. The slave processor calculates the hash value of the join key in each record of the sales data 6a. When the flag of the calculated hash value is found to be on in the hash table 600, the data is selected as a join candidate data. The selected data is stored in the sales table 401a.

As stated, in embodiment 2, unnecessary sales data is eliminated from the sales tables 401a–401d, which are created with the join candidate data by using the hash table 600 in each slave processor.

(8) The sales table 401a is sorted with the man number which is the join key, and the sort result sales table 400a is created.

(9) The sort result sales table 400a is transferred to the master processor.

(10) The sales tables 400a–400d, which are transferred from each of the slave processors, are merge-sorted in accordance with the man number, and a sales table 200 is created. The sales table 200 corresponds to the second main table in FIG. 5.

(11) A join processing of the employee table 100 and the sales table 200 is made. The employee table 100 and the sales table 200 are joined in accordance with the join key check of the man number. Since the records in the sales table 200 are already selected with reference to the hash table, the number of the records is lessened. Therefore, the join processing is able to be performed in high speed. After the join processing, the joined table 500 is created.

In embodiment 2, the number of records in the sales table is lessened with reference to the hash table in the slave processors. Therefore, the data transfer volume from the slave processors to the master processor is able to be decreased. Furthermore, the join key check processing in the master processor is able to be made efficiently.

Embodiment 3.

Figure 9:
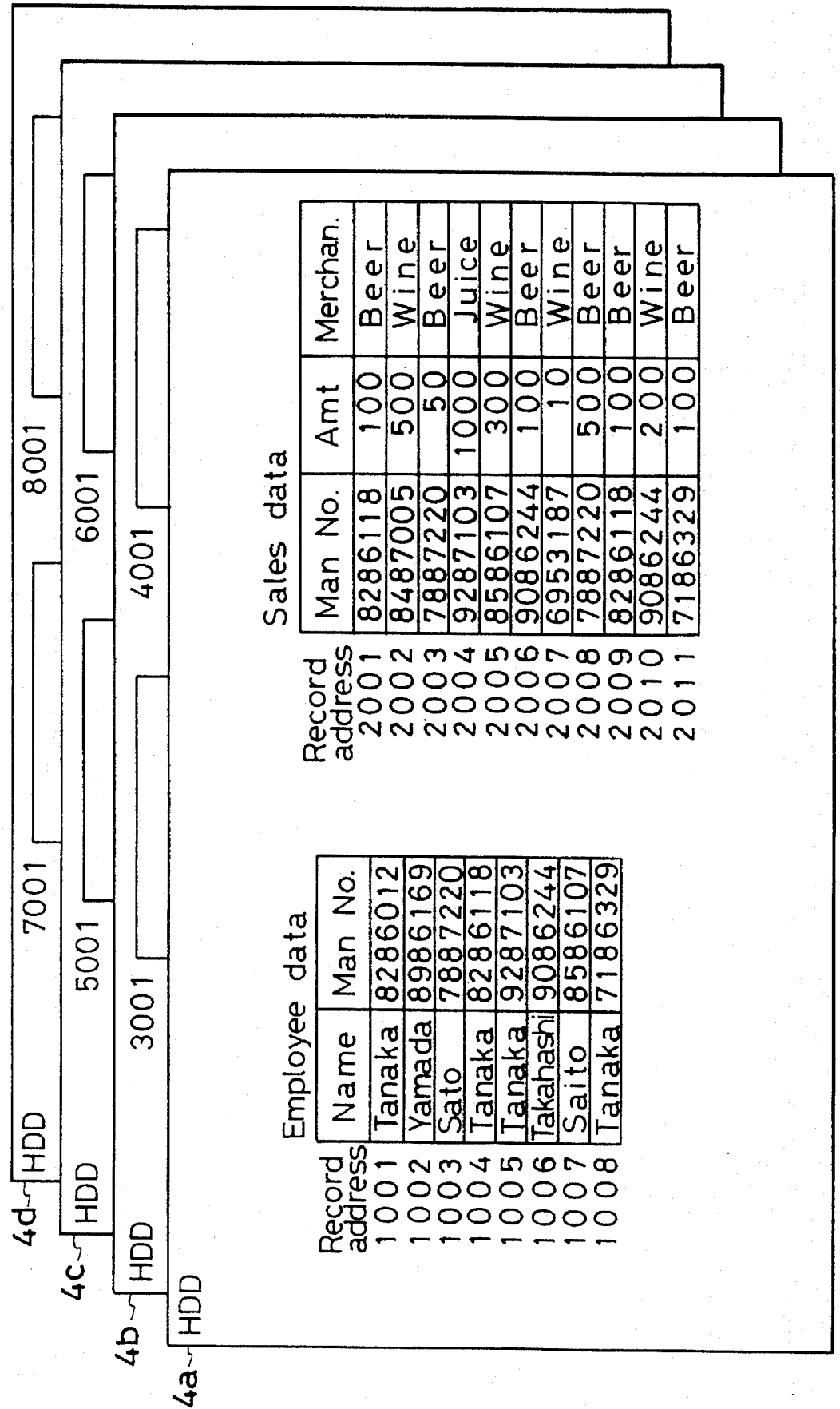
FIG. 9 shows a data in embodiment 3 of this invention.

FIG. 9 shows employee data and sales data which are used in embodiment 3. In embodiment 3, the employee data and the sales data are not used directly. Instead, a record address, where a man number as a join key and each record are located, is used.

In FIG. 9, an address of 1000s is allocated to the employee data in the disk drive 4a, and a record address of 2000s is allocated to the sales data in the disk drive 4a. A record address of 3000s is allocated to the employee data in the disk drive 4b, and a record address of 4000s is allocated to the sales data in the disk drive 4b. Similarly, for disk drives 4c and 4d, a different record address is allocated to each of the employee data and each of the sales data.

As stated, the employee data and the sales data are distributed and stored in each of the disk drives 4a–4d. When the record address is referred to, the disk drive, where the record is stored, is able to be known. For example, a record with a record address of 5005 is able to be recognized as data in the disk drive 4c.

Figure 10:
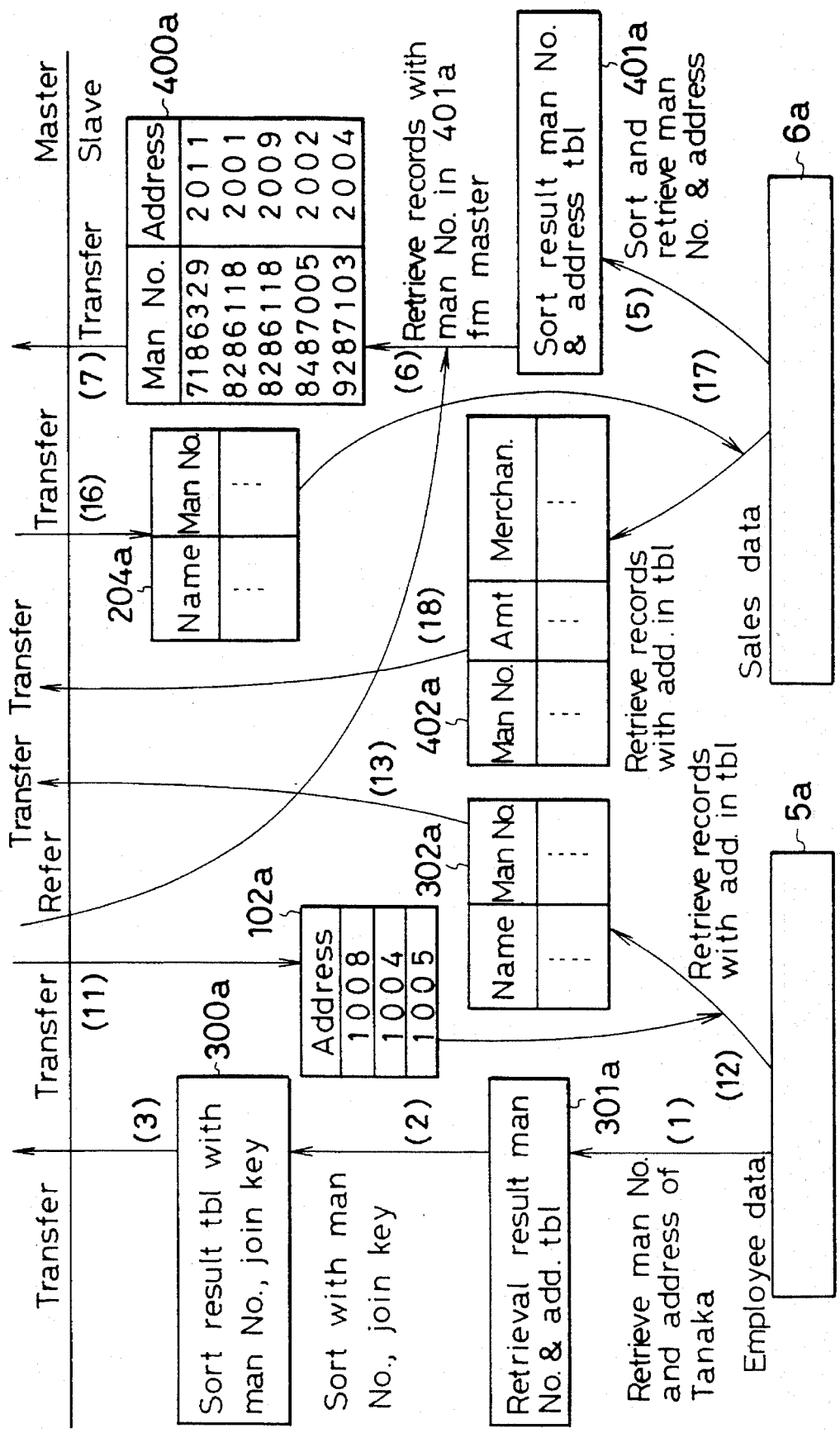
FIG. 10 illustrates an operation of the slave processor in embodiment 3 of this invention.
Figure 11:
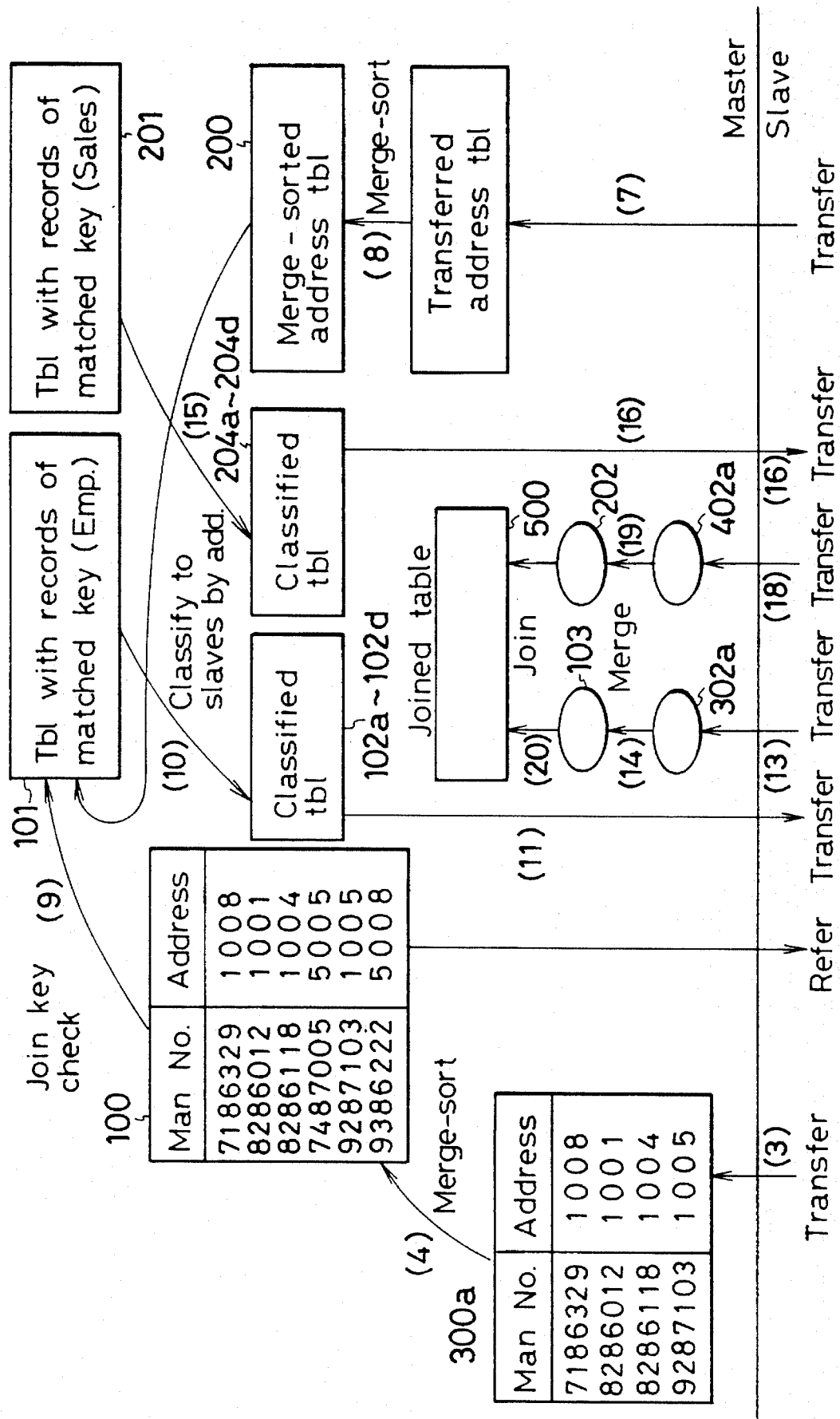
FIG. 11 illustrates an operation of the master processor in embodiment 3 of this invention.

In the following example, such data is used. FIG. 10 and FIG. 11 show another sample of the join processing system and method related to this invention. FIG. 10 illustrates the operation of the slave processors, and FIG. 11 illustrates the operation of the master processor.

The operation of embodiment 3 is as follows.

(1) Man numbers and addresses of employees, whose family names are Tanaka, are retrieved from the employee data 5a. Embodiment 3 differs from embodiment 1 and embodiment 2, as the addresses are retrieved in embodiment 3. The retrieved man numbers and addresses are stored in the retrieval result address table 301a.

(2) The retrieval result address table 301a is sorted in accordance with the man number, which is the join key, and the sort result address table 300a is created. The sort result address table 300a corresponds to the first sub-table in FIG. 5.

(3) The sort result address table 300a is transferred to the master processor.

(4) The master processor receives the transferred address table. When the master processor receives the address tables 300a–300d from each of the slave processors 3a–3d, the master processor merge-sorts the data in the address tables in accordance with the man number, and creates an address table 100.

(5) The slave processors retrieve the man numbers and the addresses from the sales data 6a. The slave processors sort the addresses in accordance with the man numbers, and create a sort result address table 401a.

(6) The slave processors refer to the address table 100, which is created in the master processor. The slave processors select the join candidate data which matches in man numbers with the sort result address table 401a and creates the address table 400a. In embodiment 3, the slave processors refer to the man number in the address table 100, which is created in the master processor, and select data. Since the data selection is made in the slave processors, the number of records in the created address table 400a is lessened. The selection process is made in parallel in each of the slave processors.

(7) The slave processors transfer the address table 400a to the master processor.

(8) The master processor receives the transferred address table. The master processor merge-sorts the address tables 400a–400d, which are received from each of the slave processors 3a–3d, according to the man numbers, and creates an address table 200. The address table 200 corresponds to the second main table in FIG. 5.

(9) A join key check is made by using the address table 100, which is created from the employee data, and the address table 200, which is created from the sales data. After the join key check, records which match in the join key are selected, and tables 101 and 201 are created from the selected records.

(10) The table 101 is classified to each of the slave processors 3a–3d, and tables 102a–102d, which show the classification result, are created. The address table 100 shows that the records with the address of 1000s are sent from the slave processor 3a and records with the address of 3000s are sent from the slave processor 3b. The source is distinguished by referring to the address. Therefore, the records in the table 101 may be classified to the records of each of slave processors 3a–3d. The classified tables or address tables 102a–102d are created from the classification result. Practically, the created tables are divided for each slave processor. Four divided tables 102a–102d exist.

(11) The classified tables 102a–102d are transferred from the master processor to each of the slave processors.

(12) The slave processor refers to the transferred address table 102a, and retrieves the records, of which addresses are stored in the address table 102a, from the employee data 5a. The retrieved record is stored in an employee table 302a.

(13) The retrieval result employee table 302a is transferred to the master processor. The master processor receives the transferred employee table 302a. The master processor also receives employee tables 302b–302d from other slave processors.

(14) The master processor merges the received employee tables 302a–302d, and creates employee table 103.

(15) The table 201 shows the retrieval result of records which are matched in the join key check of the address table, which is created from the sales data. The table 201 is classified to tables 204a–204d for each of the slave processors. By referring to the addresses in the table 201, the slave processor, which is the source of the records, is able to be recognized. Therefore, the master processor recognizes the source slave processor of the records by referring to the address, and creates four classified tables 204a–204d.

(16) The master processor transfers the classified tables to each of the slave processors. The slave processor receives the transferred table 204a.

(17) The slave processor refers to the received table 204a, and retrieves records in the address, which is stored in the table 204a, from the sales data 6a. The retrieved records are stored in the sales table 402a.

(18) The sales table 402a is transferred to the master processor. The master processor receives the sales tables 402a–402d which are transferred from each of the slave processors.

(19) The master processor merges the received sales tables 402a–402d, and creates the sales table 202.

(20) The join processing of the employee table 103 and the sales table 202 is made, and the joined table 500 is generated.

As stated, in embodiment 3, when the join key and the address are sent from the slave processors to the master processor, the join key and the address are sent after being filtered in each of the slave processors instead of being sent unconditionally. Owing to the filtering operation, the volume of data which is sent from the slave processors to the master processor is able to be lessened. The filtering is performed in parallel in each of the slave processors.

Embodiment 4.

Figure 12:
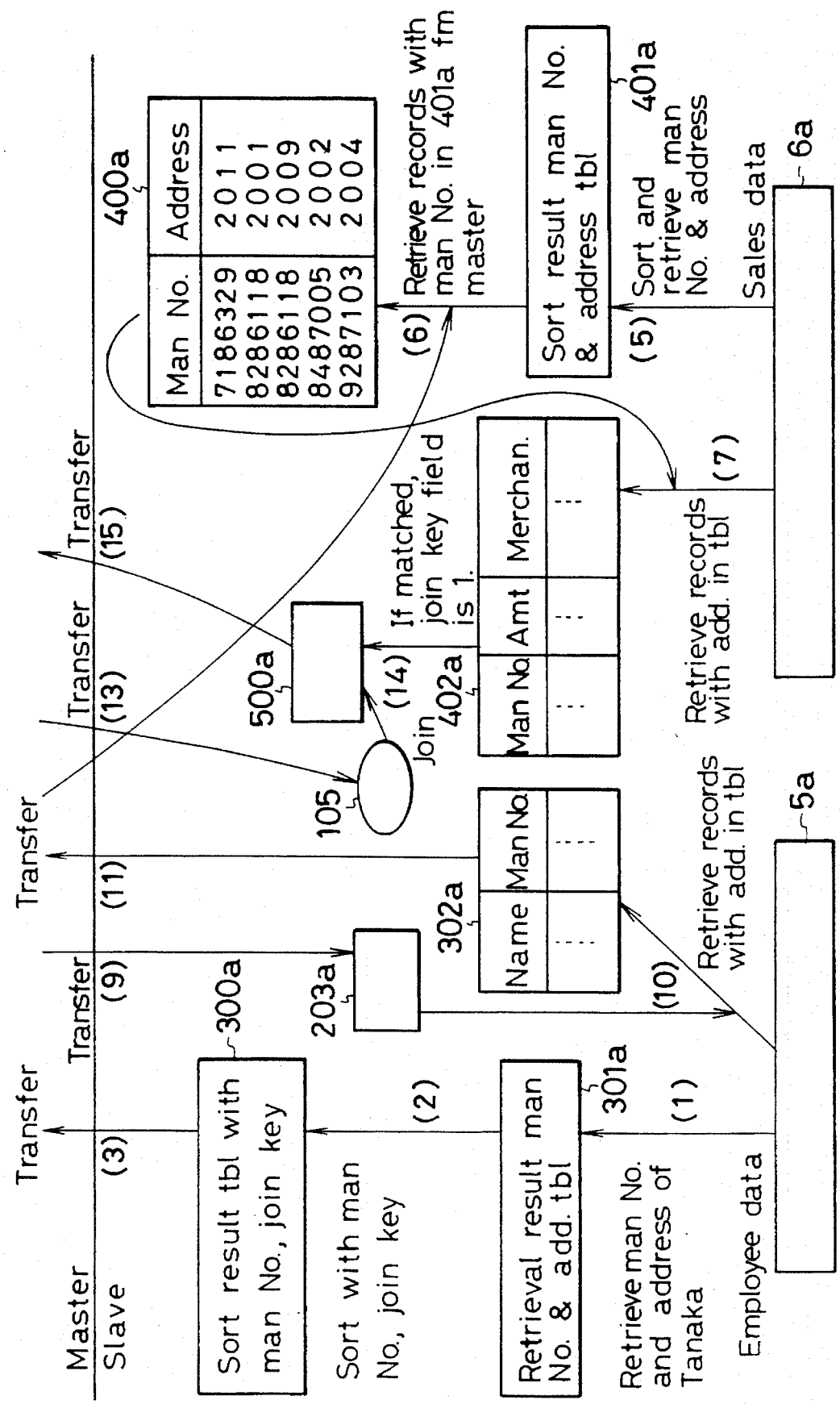
FIG. 12 illustrates an operation of the slave processor in embodiment 4 of this invention.
Figure 13:
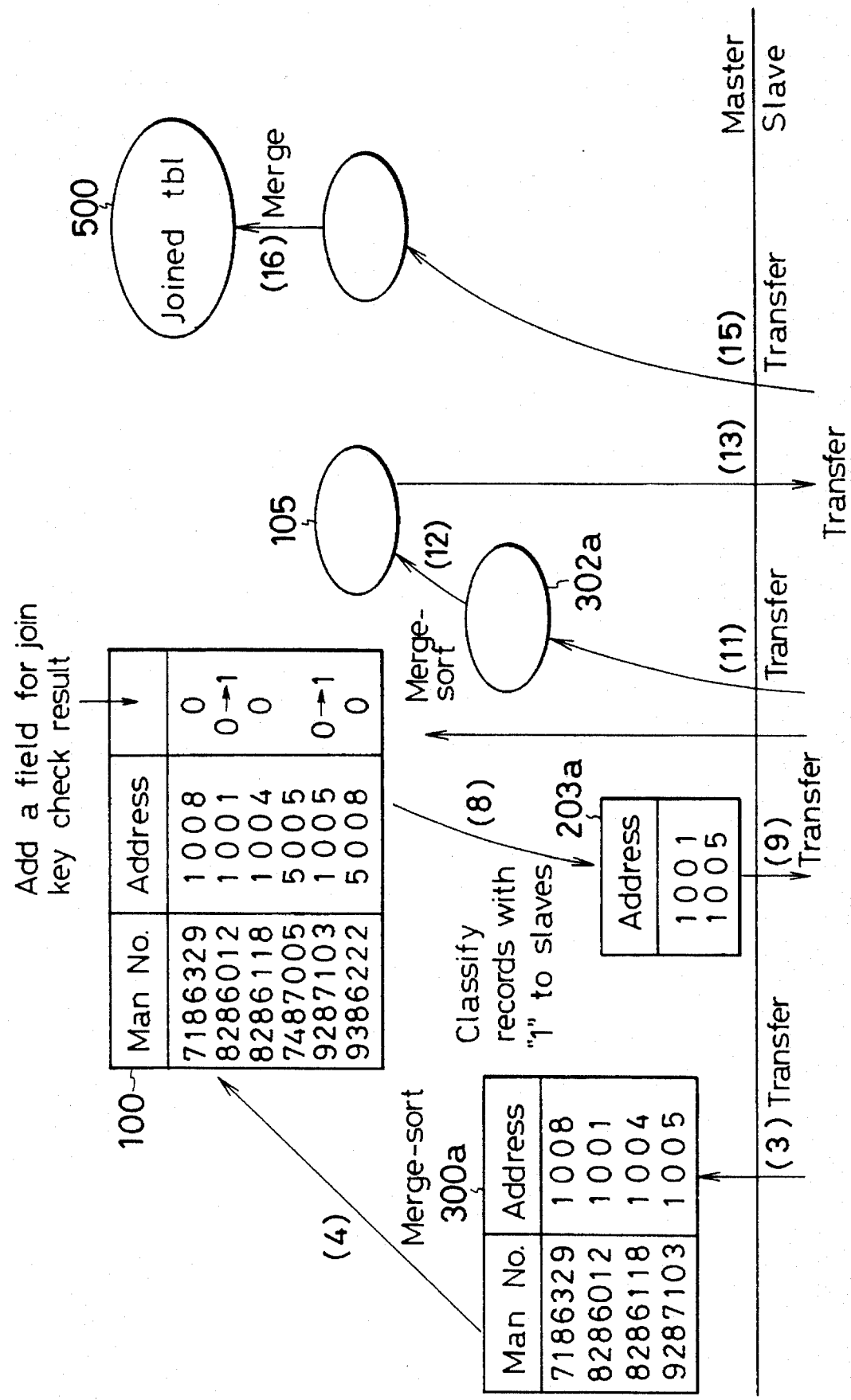
FIG. 13 illustrates an operation of the master processor in embodiment 4 of this invention.

FIG. 12 and FIG. 13 show another example of the join processing system and method according to this invention. FIG. 12 shows the details of operation in the slave processors, and FIG. 13 shows the details of operation in the master processor.

In embodiment 4, the join processing is made by retrieving the man numbers, which are the join keys, and the addresses by using the data shown in FIG. 9.

Since beginning operation of embodiment 4 is the same as steps (1)–(5) of embodiment 3, the explanation thereof is omitted. In addition to the function stated in embodiment 3, a field to store the result of the join key check is added in the address table 100, which is retrieved from the employee data 5a and created in the master processor, in embodiment 4.

In the operation from step (6), the field is used as follows.

(6) As in embodiment 3, the address table 400a is created by retrieving the records, which match in the man number, from the address table 401a with reference to the address table 100. The records which match in the man number are given value "1" in the field of the address table 100. The field of the address table 100 is zero-cleared in advance. When the man number is matched in the join key check, the field is changed from "0" to "1."

In embodiment 4, the join key check is made in the slave processors, and the result of the join key check is stored in the field of the address table in the master processor. Since the join key check is made in the slave processors, all the records in the created address table 400a are already checked with the join key, and confirmed to be the records for the join processing.

(7) The corresponding records are retrieved from the sales data 6a based on the addresses in the address table 400a. The retrieved records are stored in the sales table 402a.

(8) In the master processor, only the records which carry "1" in the field of the address table 100 are selected, and tables which correspond to each of the slave processors are created in accordance with the addresses.

(9) The master processor transfers each of the created tables to a corresponding slave processor. The transferred address table 203a is received in the slave processor.

(10) The records with corresponding addresses are retrieved from the employee data 5a by referring to the received address table 203a. The retrieved data is stored in the employee table 302a.

(11) The employee table 302a is transferred to the master processor. The master processor receives the transferred employee table 302a.

(12) The master processor merge-sorts the employee tables 302a–302d, which are transferred from each of the slave processors, and creates the employee table 105.

(13) The employee table 105 is transferred to each of the slave processors. The slave processor receives the employee table 105.

(14) The slave processor performs the join processing of the received employee table 105 and the sales table 402a, and a joined sub-table 500a is created.

(15) The slave processor transfers the joined sub-table 500a to the master processor. The master processor receives the joined sub-tables 500a–500d, which are transferred from each of the slave processors.

(16) The master processor merges the received joined sub-tables 500a–500d, and creates the joined table 500.

As stated, in embodiment 4, the join key check is made in parallel in the slave processors, and the results of the join key check in the slave processors are stored in the fields of the address table 100. Since the join key check is made in the slave processors, a number of records to be selected in the slave processors may be lessened. Furthermore, since a number of records which are sent from the master processor to the slave processors is lessened, the data transfer volume is able to be lessened.

Embodiment 5.

Figure 14:
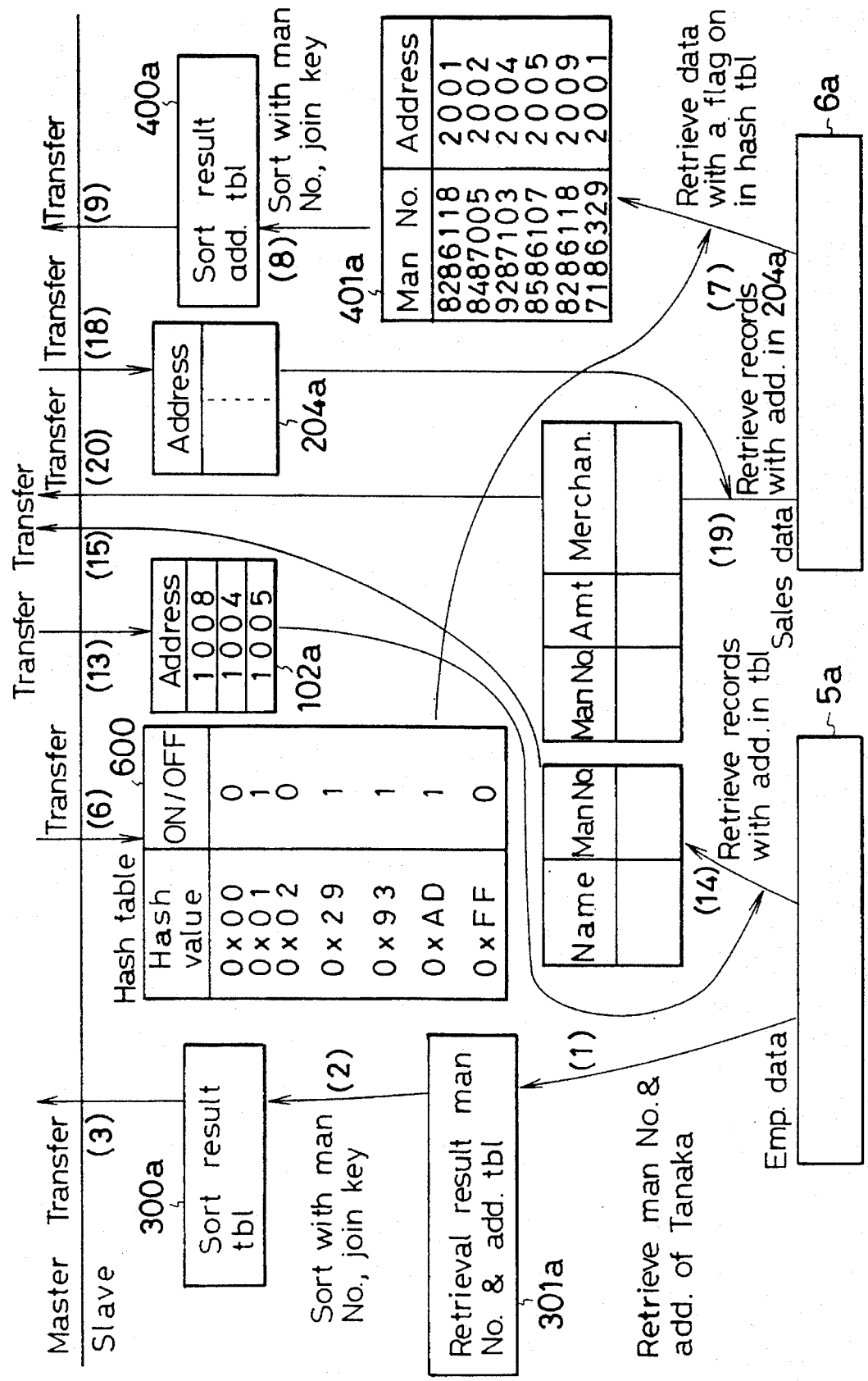
FIG. 14 illustrates an operation of the slave processor in embodiment 5 of this invention.
Figure 15:
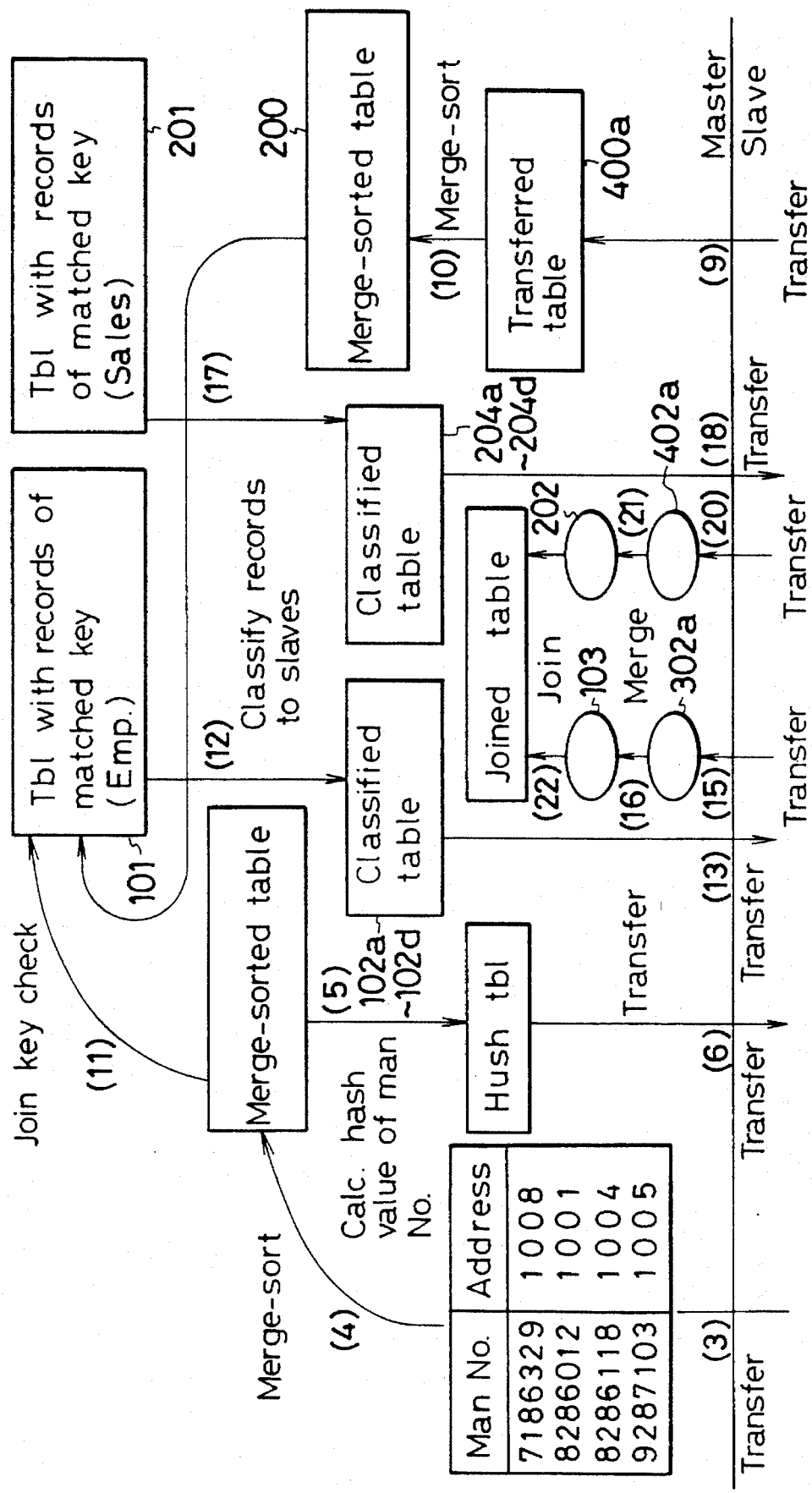
FIG. 15 illustrates an operation of the master processor in embodiment 5 of this invention.

FIG. 14 and FIG. 15 show another sample of the join processing system and method according to this invention. FIG. 14 shows the details of operation of the slave processors. FIG. 15 shows the details of operation of the master processor.

In FIG. 14 and FIG. 15, operations of steps (1)–(10) are similar to the operation in embodiment 2. However, embodiment 5 differs from embodiment 2, as the addresses, instead of the employee data and the sales data, are retrieved from the employee data 5a and the sales data 6a, in embodiment 5. Particularly, the man numbers and addresses are retrieved from the employee data 5a, and the man numbers and addresses are retrieved from the sales data 6a. Besides the method that the addresses are retrieved, the steps (1)–(10) in embodiment 5 are similar to the steps (1)–(10) of embodiment 2.

Particularly, in the steps of (1)–(10), the join candidate data is selected from the sales data 6a with reference to the hash table in (7). The hash value is calculated from the man number of the sales data. When the calculated hash value matches with the hash value in the hash table, the record is selected as the join candidate. When the calculated hash value does not exist in the hash table, the record is discarded.

In this way, a number of records in the address table 401a is able to be lessened. Therefore, a number of records which are sent from the slave processors to the master processor is able to be lessened, and the join key check processing in the master processor is able to be lessened.

Steps (11)–(22) in embodiment 5 are similar to steps (9)–(20) in embodiment 3. Since the addresses are retrieved in both embodiments, the employee data and sales data must be selected again by using the addresses. Steps (11)–(20) include the retrieval of the actual employee data and sales data in accordance with the addresses and the join processing of the retrieved data.

Embodiment 6.

Figure 16:
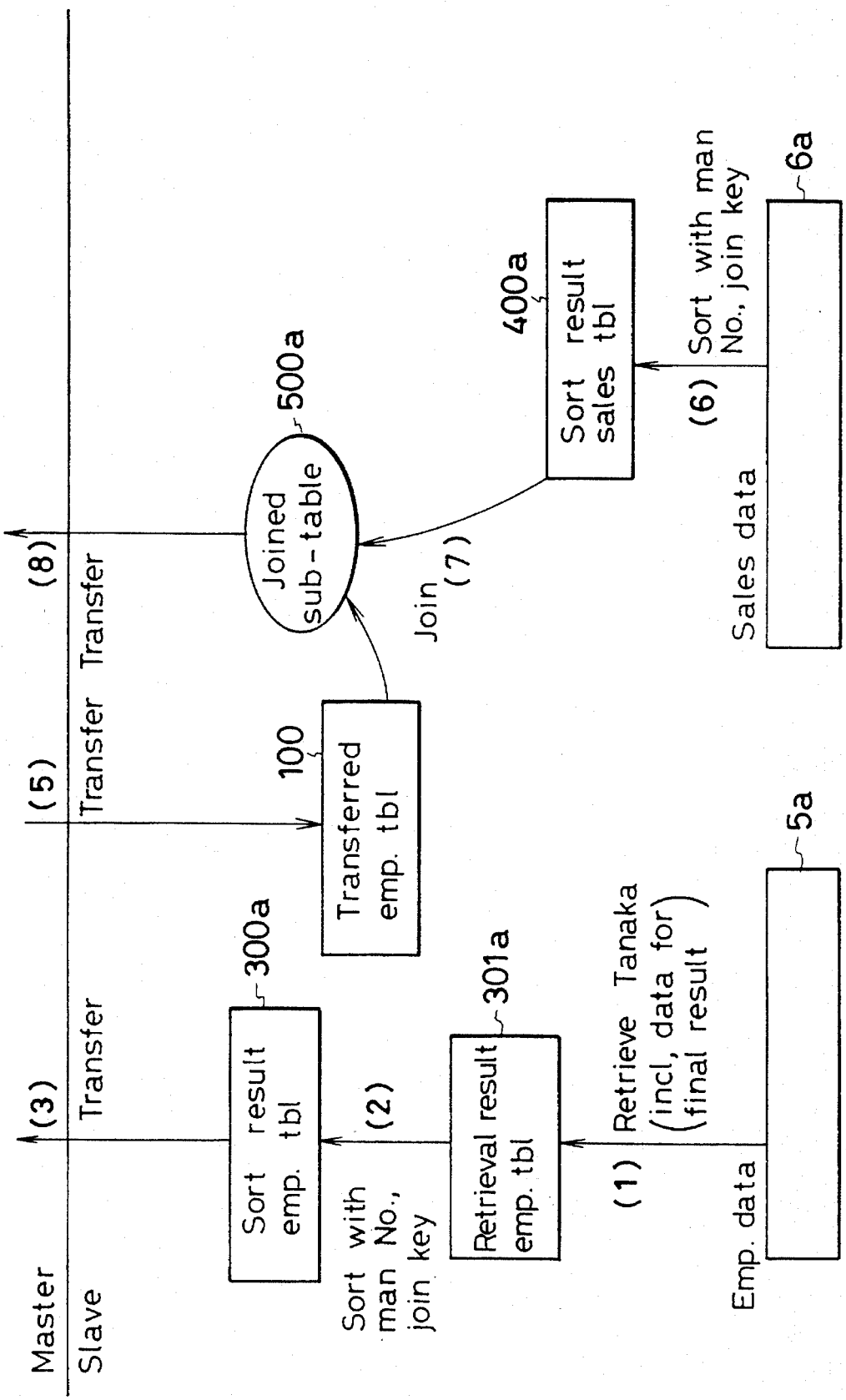
FIG. 16 illustrates an operation of the slave processor in embodiment 6 of this invention.
Figure 17:
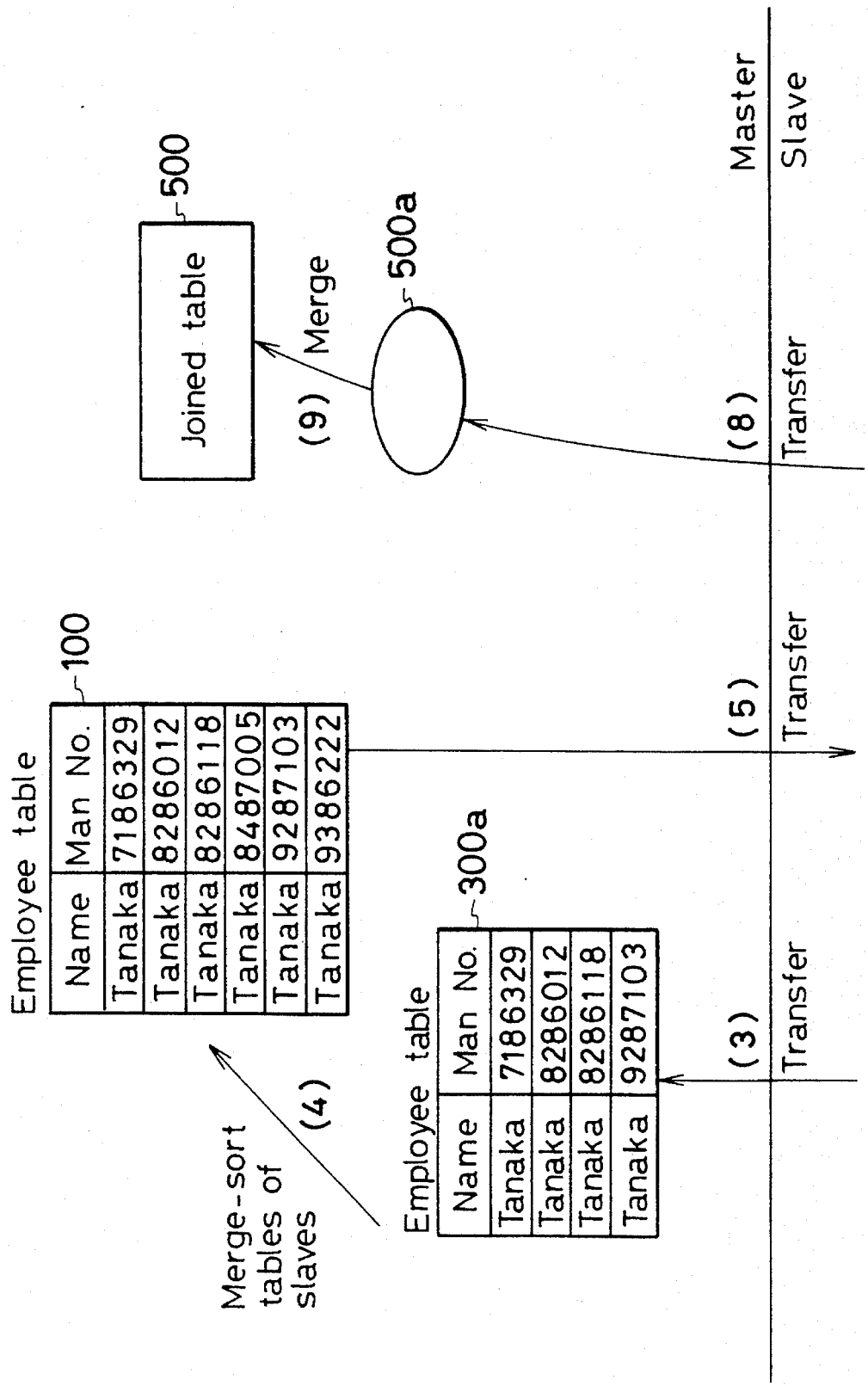
FIG. 17 illustrates an operation of the master processor in embodiment 6 of this invention.

FIG. 16 and FIG. 17 show another sample of the join processing system and method according to this invention. FIG. 16 shows the details of operation in the slave processors, and FIG. 17 shows the details of operation in the master processor.

In embodiment 6, the master processor is concentrated in collecting data from the multiple slave processors and merge-sorting the collected data. In embodiment 6, the case in which the master processor makes only two merge operations is explained. Two operations are to collect the employee tables from the multiple slave processors and merge the tables into a merge result employee table, and to collect the finally join processed records from each of the slave processors and merge the records.

The steps are discussed below.

(1) The employees, whose family names are Tanaka, are retrieved from the employee data 5a. The retrieved records are stored in the retrieved result employee table 301a.

(2) The retrieval result employee table 301a is sorted in accordance with the man number which is the join key. The sorting result is stored in the sort result employee table 300a.

(3) The sort result employee table 300a is transferred to the master processor. The master processor receives the transferred employee table 300a. The master processor also receives the employee tables 300b–300d from each of the slave processors.

(4) The master processor merges the received employee tables 300a–300d in accordance with the man number, and creates the employee table 100.

(5) The master processor transfers the created employee table 100 to each of the slave processors. The slave processors receive the employee table 100.

(6) The sales table 400a is generated by sorting the sales data 6a in accordance with the join key of the man number.

(7) The employee table 100, which is transferred from the master processor, and the sales table 400a are joined, and the joined sub-table 500a is created.

(8) The slave processor transfers the joined sub-table 500a to the master processor. The master processor receives the joined sub-table 500a. The master processor also receives the joined sub-tables 500b–500d which are transferred from the other slave processors.

(9) The master processor merges the received joined sub-tables 500a–500d, and creates a joined table 500.

In embodiment 6, in addition to the functions which are already stated, all the join key checks and join processing operations are made in the slave processors. Since the employee table 100 which is created in the master processor is transferred to the slave processors, the slave processors are able to make join processing by referring to the employee table 100 and the sales table. Hence, the join processing is made in parallel in the slave processors, and the processing is able to be performed in high speed. Additionally, since the join processing is made in the slave processors, the master processor does not need to make the join processing. Hence, a join processing burden to the master processor is diminished.

Embodiment 7.

Figure 18:
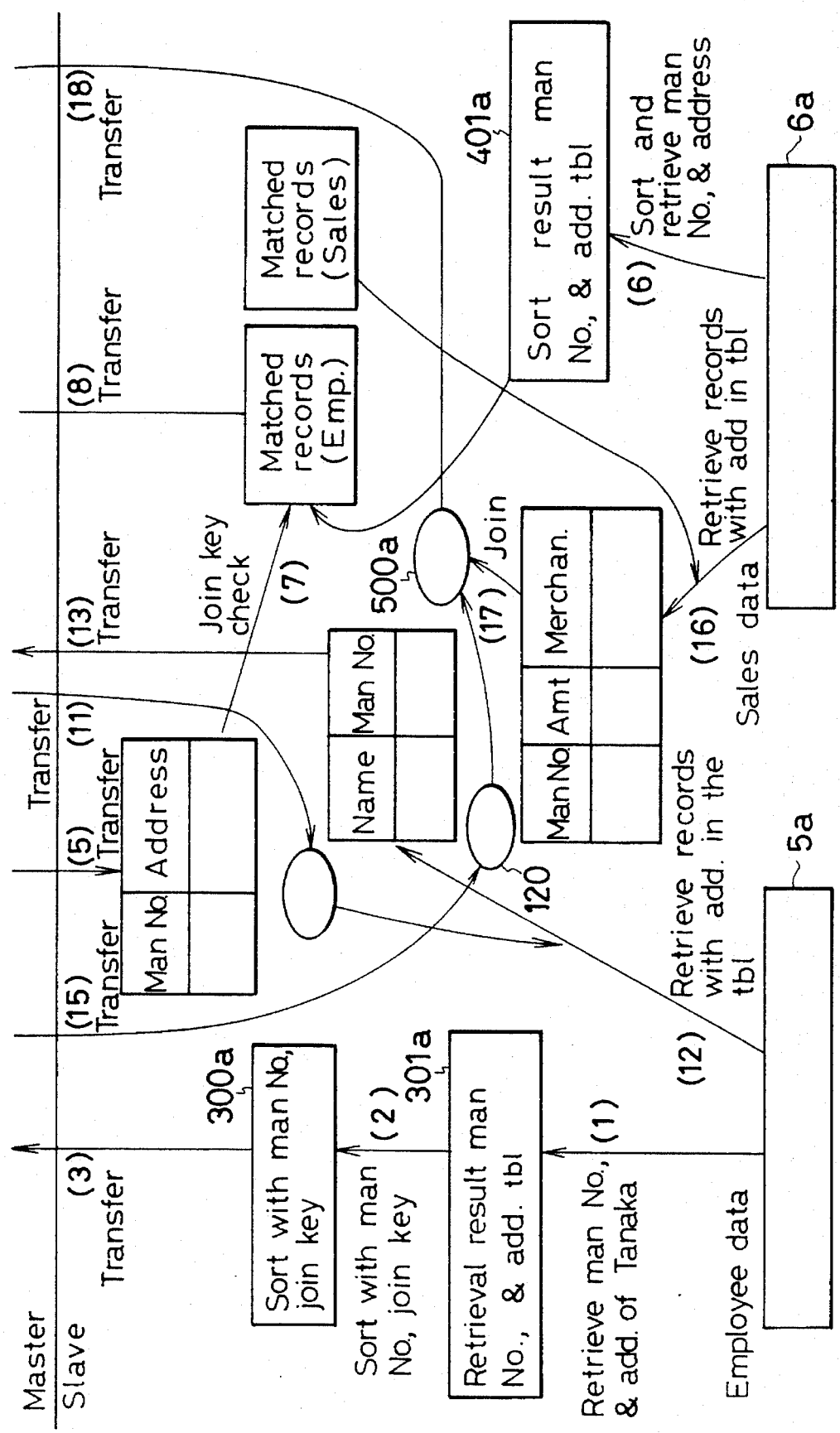
FIG. 18 illustrates an operation of the slave processor in embodiment 7 of this invention.
Figure 19:
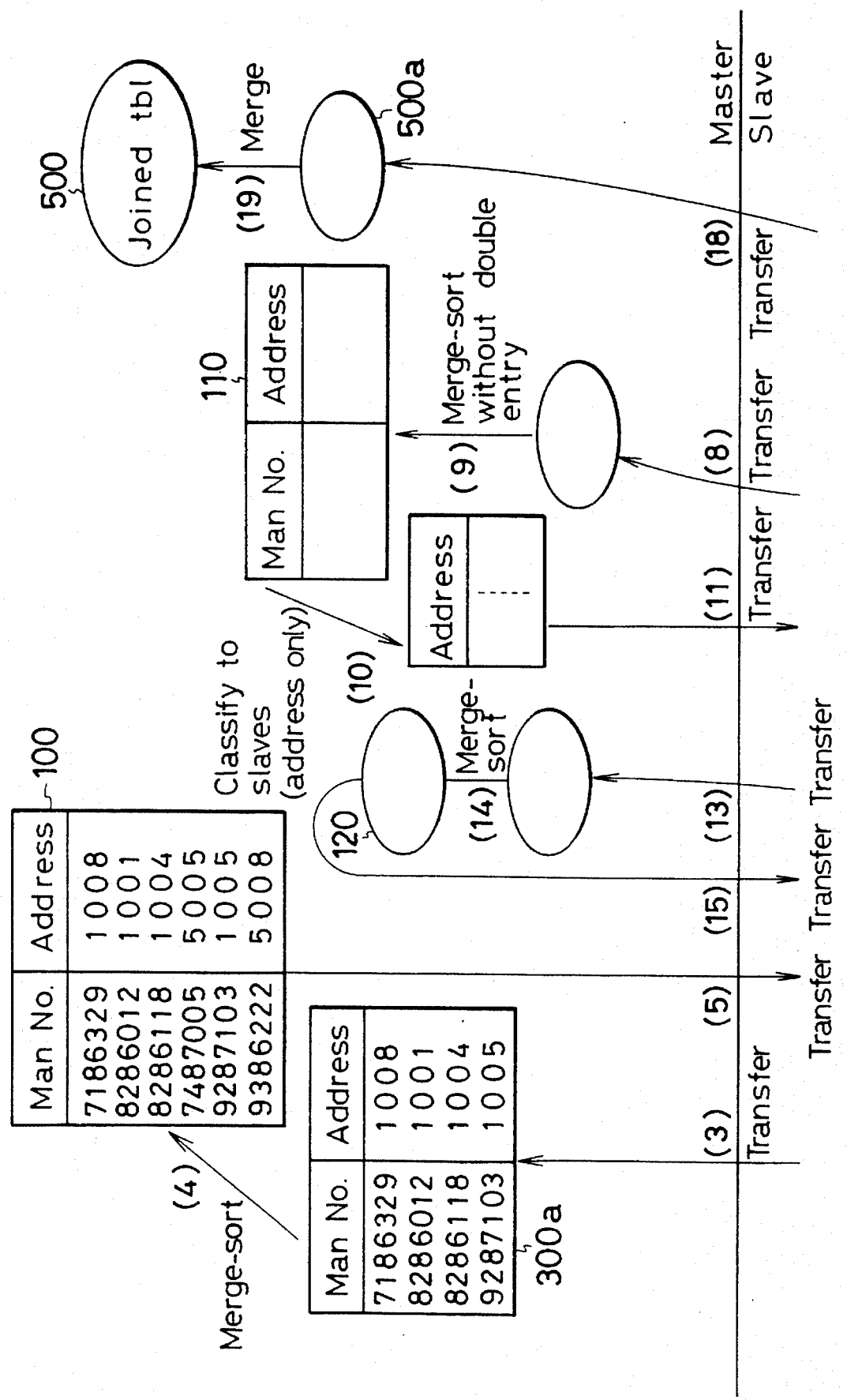
FIG. 19 illustrates an operation of the master processor in embodiment 7 of this invention.

FIG. 18 and FIG. 19 illustrate another example of the join processing system and method according to this invention. FIG. 18 shows details of operation in the slave processors, and FIG. 19 shows details of operation in the master processor.

In embodiment 7, the master processor is concentrated on collecting data from the multiple slave processors and merging the collected data, which is similar to embodiment 6.

In embodiment 7, an address is retrieved first, then the actual data is retrieved. In embodiment 7, the following four merge operations in the master processor are explained:

collecting the addresses, which are retrieved from the employee data from the multiple slave processors, and merge-sorting the addresses, collecting the addresses, which is performed by the join key check in the multiple slave processors, and merge-sorting the addresses, collecting the employee tables, which are retrieved according to the addresses, and merge-sorting the employee tables, and collecting the records, which are finally join-processed, and merge-sorting the records.

The master processor is concentrated on the above four merge operations. Other processing, i.e., join key check and join processing are all made in the slave processors.

Steps of embodiment 7 are as follows.

(1)–(5)

Each of the slave processors retrieves the employee table from the employee data. The master processor collects the retrieved employee tables 300a–300d, and creates a merge-sort result table 100. The table 100 is transferred to each of the slave processors.

(6)–(11)

A join key check is made by using the transferred table 100 and the table which is retrieved from the sales data, and a table with matched data is created. The created table is sent back to the master processor. The master processor merge-sorts the tables which are sent from each of the slave processors, and creates table 110. The table 110 is classified to each of the slave processors according to the address, and transferred to each of the slave processors.

(12)–(15)

Concerning records are retrieved from the employee data 5a according to the addresses in the transferred table. The slave processors transfer the retrieved records to the master processor. The master processor merge-sorts the records which are retrieved from each of the slave processors, and transmits them to each of the slave processors.

(16)–(19)

The slave processor makes the join processing of the transferred records and the records which are retrieved from the sales data, and creates a joined sub-table 500a. The joined sub-table 500a is transferred to the master processor. The master processor merges the joined sub-tables 500a–500d which are transferred from each of the slave processors, and creates a final joined table 500.

As stated, in embodiment 7, the master processor is concentrated on the merge operation and the transfer operation. Other operations such as the join key check and the join processing are made in the slave processors. Therefore, a burden to the master processor is tremendously lightened.

Embodiment 8.

Figure 20:
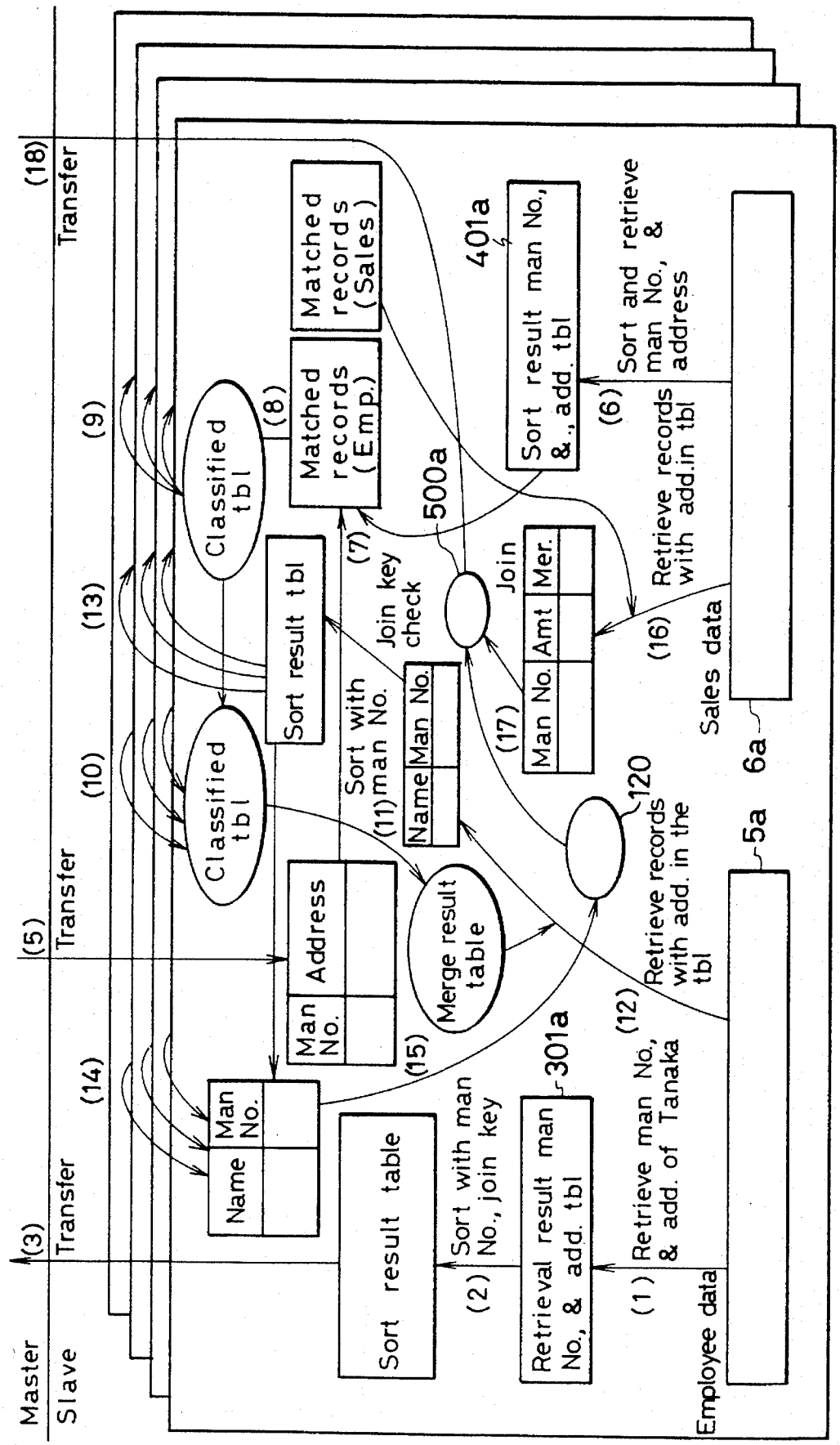
FIG. 20 illustrates an operation of the slave processor in embodiment 8 of this invention.
Figure 21:
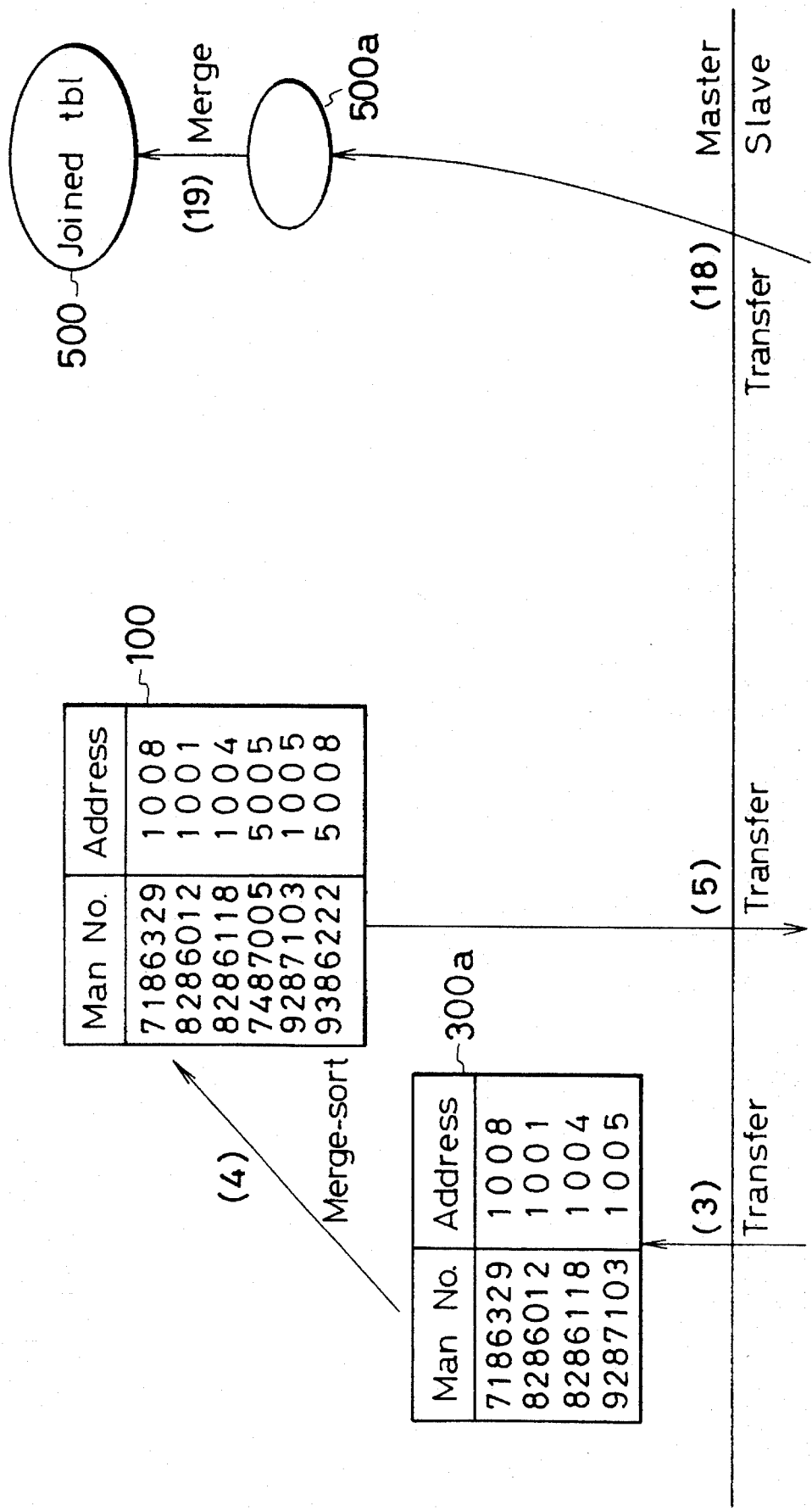
FIG. 21 illustrates an operation of the master processor in embodiment 8 of this invention.
Figure 22:
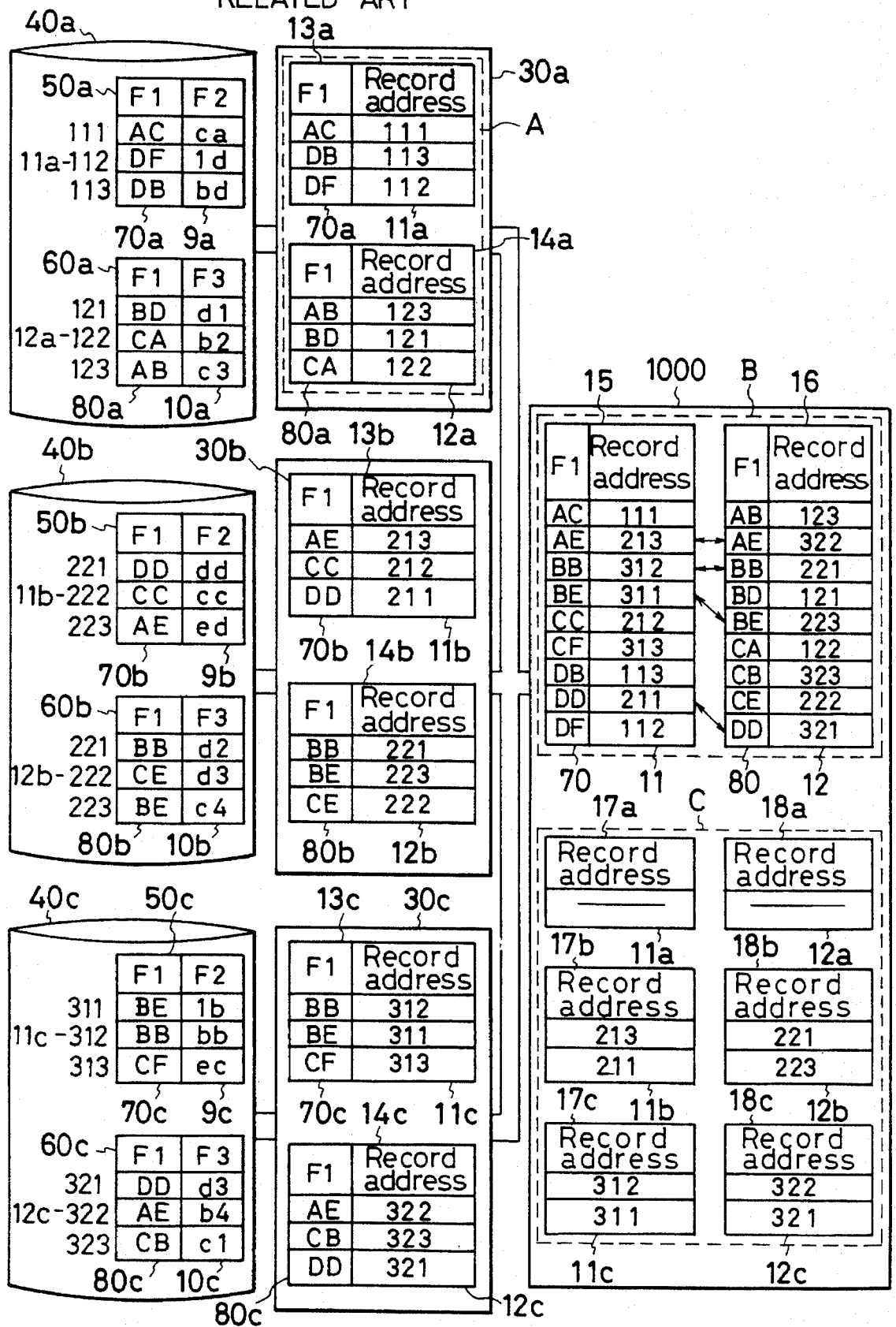
FIG. 22 shows a chart in a join processing system and method according to a related art.
Figure 23:
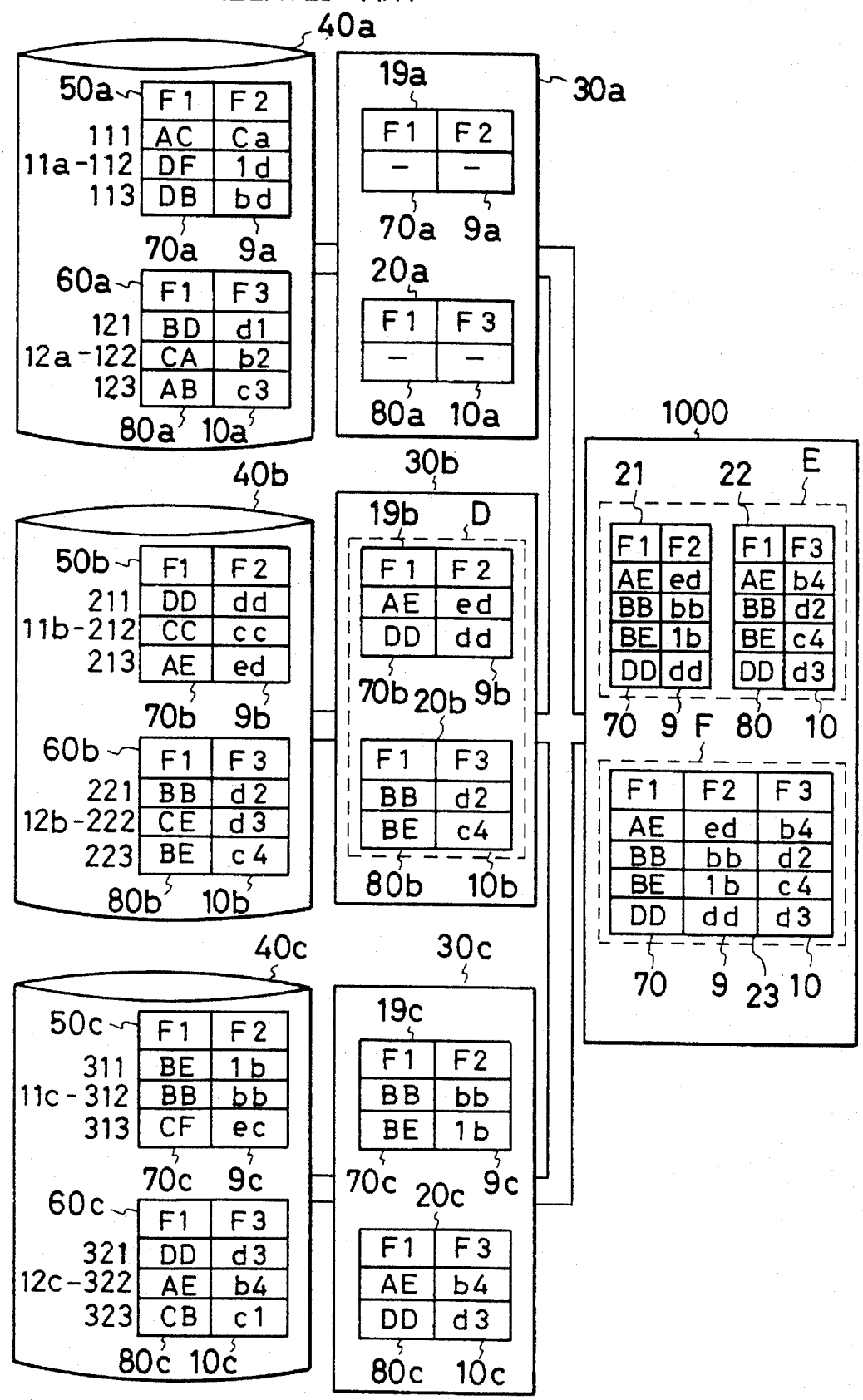
FIG. 23 shows a chart in a join processing system and method according to a related art.

FIG. 20 and FIG. 21 illustrate another sample of join processing system and method according to this invention. FIG. 20 shows the details of operation of the salve processors, and FIG. 21 shows the details of operation of the master processor.

In this example, even when the addresses are retrieved from the employee data and the sales data before the actual records are retrieved, as in embodiment 7, a burden to the master processor in merge operation is remained as in embodiment 6.

In embodiment 7, when addresses were retrieved from the employee data and the sales data, a process to retrieve the records had to follow. Therefore, a number of merge operations in the master processor was rather high. In embodiment 8, the data is able to be transferred among the slave processors, and the merge operation in the master processor is attempted to be lessened.

FIG. 20 and FIG. 21 differ from FIG. 18 and FIG. 19 of embodiment 7 in the operations of steps (8)–(15) of FIG. 18 and FIG. 19. In steps (8)–(15) of embodiment 7, the master processor performs a merge operation twice for retrieving the actual records from the addresses. However, in embodiment 8, the master processor does not perform a merge operation, as shown in FIG. 20.

Steps (8)–(15) in embodiment 8 are as follows.

(8) After a join key check operation, a table with matched data in key value is generated. Since the table includes addresses, the table is classified to each of the corresponding slave processors according to the addresses.

(9) The classified tables are transferred to each of the slave processors. The transfer to each of the slave processors may be made either directly or via the master processor. In case that the transfer is made via the master processor, the master processor only transfers the data simply without a merge operation. Therefore, a burden to the master processor is not great.

(10) The slave processor receives the classified tables which are transferred from other slave processors, and its own table which is classified in its own slave processor.

(11) Four classified tables are merged in the slave processor. When it is found that the addresses are doubled at the time of merge operation, one of the doubled addresses is discarded.

(12) Concerning records are retrieved from the employee data, according to the addresses in the merge result table.

(13) The retrieved records are sorted, and the sort result table is transferred to each of the slave processors.

(14) The slave processor receives the records which are transferred from other slave processors, and the records of its own slave processor.

(15) Four received tables are merge-sorted according to the man numbers.

In this way, the employee table 120 is generated. The remainder of the process is similar to embodiment 7. Therefore, an explanation is omitted.

In embodiment 8, a burden to the master processor is further lessened relative to embodiment 7. Since the slave processors transfer the data among the slave processors, a burden to the master processor is further lessened.

Embodiment 9.

Thus far, operations such as transferring the tables, referring to the tables, transferring the hash tables, referring to the hash tables, etc. have been explained. The operations of referring to the tables and charts may be replaced with the operations of transferring the tables and charts. The operations of transferring the tables and charts may be replaced with the operations of referring to the tables and charts.

Regarding referring to the tables and charts, a traffic volume between the master processor and the slave processors is increased. However, the data exists either in the master processor or the slave processors, a merit exists that a memory field in another processor is not pressured. Meanwhile, in the operation of transferring data, a disadvantage exists that the memory in the processor, to which the data is transferred, is pressured. However, when the tables and charts are transferred once, the reference relationship between the master processor and the slave processors is diminished. Hence, the traffic volume between the master processor and the slave processors is able to be lessened.

Embodiment 10.

In the previously described embodiments, the operations in which the records of the employee data and the sales data are used directly and the operations in which the addresses of the employee data and the sales data are used are shown. However, these operations of using records and using addresses may be combined. For example, the man numbers and the addresses may be retrieved from the employee data, while the man numbers and the records, themselves, are retrieved from the sales data. Or, vice versa is possible.

Embodiment 11.

In embodiment 10, two kinds of data, the employee data and the sales data, are used. Alternatively, either three or four kinds of data may be joined in the join processing.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A join processing system which joins distributed first and second data, the first data including a first join key, the second data including a second join key and produces a joined table, the join processing system comprising:

(a) a plurality of recording means for storing the distributed first and second data;

(b) a plurality of sub-processor means, each respectively coupled to a respective recording means of the plurality of recording means, for retrieving the first and second data from the respective recording means and outputting the first and second data; and (c) main processor means for receiving the first and second data from the plurality of sub-processor means and producing the joined table;

wherein each of the sub-processor means retrieves the first data with the first join key from the respective recording means and produces a first sub-table including the first join key based on the first data including a predetermined value, and transfers the first subtable to the main processor means;

wherein the main processor means, receives the first sub-tables from the plurality of sub-processor means, and produces a first main table;

wherein each of the sub-processor means retrieves the second data in the respective recording means with a second join key equal to a first join key included in the first main table, produces a second sub-table based on the retrieved second data, and transfers the second sub-table to the main processor means; and wherein the main processor means receives the second sub-table from the plurality of sub-processor means, produces a second main table, joins the first and second data based on the first and second main tables, and produces the joined table.

2. A join processing system which joins distributed first and second data, the first data including a first join key, the second data including a second join key and produces a joined table, the join processing system comprising:

(a) a plurality of recording means for storing the distributed first and second data;

(b) a plurality of sub-processor means, each respectively coupled to a respective recording means of the plurality of recording means, for retrieving the first and second data from the respective recording means and outputting the first and second data; and (c) main processor means for receiving the first and second data from the plurality of sub-processor means and producing the joined table;

wherein each of the sub-processor means retrieves the first data with the first join key from the respective recording means and produces a first sub-table including the first join key based on the retrieved first data including a predetermined value, and transfers the first sub-table to the main processor means;

wherein the main processor means receives the first sub-tables from the plurality of sub-processor means, produces a first main table, calculates a hash value of each first join key in the first main table, produces a hash table showing an existence of the hash values and transfers the hash table to each of the plurality of sub-processor means;

wherein each of the plurality of sub-processor means receives the hash table, calculates a second join key hash value of the second join key of the second data, checks an existence of the calculated second join key hash value in the hash table, selects a second data whose second join key hash value is confirmed to exist in the hash table, produces a second sub-table based on selected second data, and transfers the second sub-table to the main processor means; and wherein the main processor means receives the second sub-table from each of the plurality of sub-processor means, produces a second main table, joins the first and second data based on the first and second main tables, and produces the joined table.

3. A join processing system which joins distributed first and second data, the first data including a first join key, the second data including a second join key and produces a joined table, the join processing system comprising:

(a) a plurality of recording means for storing the distributed first and second data;

(b) a plurality of sub-processor means, each respectively coupled to a respective recording means of the plurality of recording means, for retrieving the first and second data from the respective recording means and outputting the first and second data; and (c) main processor means for receiving the first and second data from the plurality of sub-processor means and producing the joined table;

wherein each of the plurality of sub-processor means extracts the first join key of the first data and a first address of the first data in the respective recording means and produces a first subtable based on the extracted first join key and the first address, and transfers the first sub-table to the main processor means;

wherein the main processor means receives the first sub-tables from the plurality of sub-processor means, and produces a first main table;

wherein each of the plurality of sub-processor means refers to the first main table, compares the second join key of the second data with the first join keys included in the first main table, selects second data whose second join key is matched with one of the first join keys in the first main table, produces a second sub-table based on the selected second data, and transfers the second sub-table to the main processor means; and wherein the main processor means receives the second sub-table from the plurality of sub-processor means, produces a second main table, joins the first and second data based on the first and second main tables, and produces the joined table.

4. The join processing system of the claim 3, wherein the main processor means provides a flag field corresponding to each of the first data in the first main table, wherein each of the plurality of sub-processor means stores a comparison result in the flag field when the subprocessor means compares the second join key of the second data with the first join keys included in the first main table to select the second data; and wherein the main processor means joins the first and second data according to a comparison result stored in the flag field in the first main table.

5. A join processing system which joins distributed first and second data, the first data including a first join key, the second data including a second join key and produces a joined table, the join processing system comprising:

(a) a plurality of recording means for storing the distributed first and second data;

(b) a plurality of sub-processor means, each respectively coupled to a respective recording means of the plurality of recording means, for retrieving the first and second data from the respective recording means and outputting the first and second data; and (c) main processor means for receiving the first and second data from the plurality of sub-processor means and producing the joined table;

wherein each of the plurality of sub-processor means retrieves the first data with the first join key from the respective recording means and produces a first sub-table including the first join key based on the first data including a predetermined value, and transfers the first sub-table to the main processor means;

wherein the main processor means receives the first sub-tables from the plurality of sub-processor means, produces a first main table, calculates a hash value of each first join key in the first main table, produces a hash table showing an existence of the hash values, and transfers the hash table to each of the plurality of sub-processor means;

wherein each of the plurality of sub-processor means receives the hash table, calculates a second join key hash value of the second join key of the second data, checks an existence of the calculated second join key hash value in the hash table, extracts a second join key and an address of the second data whose second join key hash value is confirmed to exist in the hash table, produces a second sub-table based on the extracted second join key and address of the second data, and transfers the second sub-table to the main processor means; and wherein the main processor means receives the second sub-table from the plurality of sub-processor means, produces a second main table, joins the first and second data based on the first and second main tables, and produces the joined table.

6. A join processing system which joins distributed first and second data, the first data including a first join key, the second data including a second join key and produces a joined table, the join processing system comprising:

(a) a plurality of recording means for storing the distributed first and second data;

(b) a plurality of sub-processor means, each respectively coupled to a respective recording means of the plurality of recording means, for retrieving the first and second data from the respective recording means and outputting the first and second data; and (c) main processor means for receiving the first and second data from the plurality of sub-processor means and producing the joined table;

wherein each of the plurality of sub-processor means retrieves the first data with the first join key from the respective recording means and produces a first sub-table including the first join key based on the first data including a predetermined value, and transfers the first sub-table to the main processor means;

wherein the main processor means receives the first sub-tables from the plurality of sub-processor means, produces a first main table, and transfers the first main table to each of the plurality of sub-processor means;

wherein each of the plurality of sub-processor means receives the first main table, retrieves the second data in the respective recording means with the second join key equal to a first join key included in the received first main table, joins the first data in the received first main table and the retrieved second data based on the second join key, produces a joined sub-table, and transfers the joined sub-table to the main processor means; and wherein the main processor means receives the joined sub-table from the plurality of sub-processor means, and produces the joined table.

7. The join processing system of claim 6, wherein each of the plurality of sub-processor means extracts the second join key and an address of the second data stored in the respective recording means, compares the extracted second join key of the second data with the first join keys included in the first main table, extracts second data from the recording means based on the extracted address according to the comparison result, and produces the joined sub-table.

8. The join processing system of any one of claims 1, 2, 3, 4, or 5, wherein each of the plurality of sub-processor means includes data transfer means for transferring data among the plurality of sub-processor means.

9. A join processing method for joining distributed first and second data, the first data including a first join key, the second data including a second join key and producing a joined table, for a database system including a plurality of recording means for storing the distributed first and second data, a plurality of sub-processors, each coupled to the plurality of recording means respectively, and a main processor coupled to the plurality of sub-processors for controlling the plurality of sub-processors and producing the joined table, the join processing method comprising the steps of:

in each of the plurality of sub-processors, retrieving the first data with the first join key from the respective recording means, sorting the retrieved first data with the first join key so as to produce a first sub-table, and transferring the first sub-table to the main processor;

in the main processor, receiving the first sub-table from each of the plurality of sub-processors, merge-sorting the first sub-tables with the first join key, and producing a first main table;

in each of the plurality of sub-processors, retrieving the second data from the respective recording means, sorting the second data, extracting the second data, referring to the first join key included in the first main table, so as to produce a second sub-table, and transferring the second sub-table to the main processor; and in the main processor, receiving the second subtables from each of the plurality of sub-processors, merge-sorting the second sub-tables with the second join key so as to produce a second main table, joining the first and second data based on the first and second main tables, and producing the joined table.

10. A join processing method, for joining distributed first and second data, the first data including a first join key, the second data including a second join key and producing a joined table, for a database system including a plurality of recording means for storing the distributed first and second data, a plurality of subprocessors each coupled to one of the plurality of recording means respectively, and a main processor coupled to the plurality of subprocessors for controlling the plurality of sub-processors and producing the joined table, the join processing method comprising the steps of:

in each of the plurality of sub-processors, retrieving the first data with the first join key from the respective recording means when the first data includes a predetermined value and sorting the retrieved first data with the first join key so as to produce a first sub-table, and transferring the first sub-table to the main processor;

in the main processor, receiving the first subtables from each of the plurality of sub-processors, merge sorting the first sub-tables with the first join key so as to produce a first main table, calculating first hash values of the first join keys in the first main table, producing a first hash table showing an existence of the first hash values, and transferring the first hash table to each of the plurality of sub-processors;

in each of the plurality of sub-processors, receiving the first hash table, calculating a second hash value of a second join key of the second data, checking an existence of the calculated second hash value in the first hash table, selecting second data whose calculated second hash value is confirmed to exist in the first hash table, sorting the selected second data so as to produce a second sub-table, and transferring the second sub-table to the main processor;

in the main processor, receiving the second subtables from each of the plurality of sub-processors, merge sorting the second sub-tables with the second join key so as to produce a second main table, joining the first and second data based on the first and second main tables, and producing the joined table.

11. A join processing method for joining distributed first and second data, the first data including a first join key, the second data including a second join key and producing a joined table, for a database system including a plurality of recording means for storing the distributed first and second data, a plurality of sub-processors each coupled to one of the plurality of recording means respectively, and a main processor coupled to the plurality of sub-processors for controlling the plurality of sub-processors and producing the joined table, the join processing method comprising the steps of:

in each of the plurality of sub-processors, extracting the first join key of the first data and an address of the first data from the respective recording means, sorting the extracted first join keys and the addresses so as to produce a first sub-table, and transferring the first sub-table to the main processor;

in the main processor, receiving the first subtables from each of the plurality of sub-processors, merge-sorting the first sub-tables with the first join key so as to produce a first main table;

in each of the plurality of sub-processors, retrieving the second data from the respective recording means, sorting the second data with the second join key, comparing the second join key of the second data with the first join keys included in the first main table, selecting second data whose second join key is matched with one of the first join keys in the first main table, so as to produce a second sub-table, and transferring the second sub-table to the main processor;

in the main processor, receiving the second subtables from each of the plurality of sub-processors, merge-sorting the second sub-tables with the second join key so as to produce a second main table, joining the first and second data based on the first and second main tables and producing the joined table.

12. The join processing method of claim 11, further comprising the steps of:

in the main processor, producing a first flag field corresponding to each of the first data in the first main table, in each of the plurality of sub-processors, storing a comparison result in the first flag field when the sub-processor compares the second join key of the second data with the first join keys included in the first main table to select the second data;

in the main processor, joining the first and second data according to the comparison result stored in the first flag field in the first main table.

13. A join processing method for joining distributed first and second data, the first data including a first join key, the second data including a second join key and producing a joined table, for a database system including a plurality of recording means for storing the distributed first and second data, a plurality of sub-processors each coupled to one of the plurality of recording means respectively, and a main processor coupled to the plurality of sub-processors for controlling the plurality of sub-processors and producing the joined table, the join processing method comprising the steps of:

in each of the plurality of sub-processors, retrieving the first data with the first join key from the respective recording means, sorting the retrieved first data with the first join key so as to produce a first sub-table, and transferring the first sub-table to the main processor;

in the main processor, receiving the first sub-tables from each of the plurality of sub-processors, merge sorting the first sub-tables with the first join key so as to produce a first main table, calculating first hash values of the first join keys included in the first main table, producing a first hash table showing an existence of the first hash values, and transferring the first hash table to each of the plurality of sub-processors;

in each of the plurality of sub-processors, receiving the first hash table, calculating a second hash value of the second join key of the second data, comparing the second hash value with the first hash values in the first hash table, extracting a second join key and an address of the second data whose second hash value is confirmed to exist in the first hash table, sorting the extracted second join keys and addresses of the second data with the second join key so as to produce a second sub-table, and transferring the second sub-table to the main processor;

in the main processor, receiving the second subtables from each of the plurality of sub-processors, merge sorting the second sub-tables with the second join key so as to produce a second main table, joining the first and second data based on the first and second main tables, and producing the joined table.

14. A join processing method for joining distributed first and second data, the first data including a first join key, the second data including a second join key and producing a joined table, for a database system including a plurality of recording means for storing the distributed first and second data, a plurality of sub-processors each coupled to one of the plurality of recording means respectively, and a main processor coupled to the plurality of sub-processors for controlling the plurality of sub-processors and producing the joined table, the join processing method comprising the steps of:

in each of the plurality of sub-processors, retrieving the first data with the first join key from the respective recording means, sorting the retrieved first data with the first join key so as to produce a first sub-table, and transferring the first sub-table to the main processor;

in the main processor, receiving the first sub-tables from each of the plurality of sub-processors, merge sorting the first sub-tables with the first join key so as to produce a first main table, and transferring the first main table to each of the plurality of sub-processors;

in each of the plurality of sub-processors, receiving the first main table, retrieving the second data in the respective recording means with the second join key equal to a first join key included in the received first main table, joining the first data in the received first main table and the retrieved second data based on the second join key, producing a joined sub-table, and transferring the joined sub-table to the main processor;

in the main processor, receiving the joined sub-tables from each of the plurality of sub-processors, and merging the joined sub-tables with the first and second join key so as to produce the joined table.

15. The join processing method of claim 14 further comprising the steps of:

in each of the plurality of sub-processors, extracting the second join key and an address of the second data, comparing the extracted second join key of the second data with the first join keys included in the first main table, retrieving second data from the recording means based on the extracted address according to a comparison result, and producing the joined sub-table.

16. A join processing method for joining distributed first and second data, the first data including a first join key, the second data including a second join key and producing a joined table, for a database system including a plurality of recording means for storing the distributed first and second data, a plurality of sub-processors each coupled to one of the plurality of recording means respectively, and a main processor coupled to the plurality of sub-processors for controlling the plurality of sub-processors and producing the joined table, the join processing method comprising the steps of:

in each of the plurality of sub-processors, retrieving the first data with the first join key from the respective recording means, sorting the retrieved first data with the first join key so as to produce a first sub-table, dividing the first sub-table into a plurality of first sub-tables corresponding to the respective sub-processors, and transferring the divided first subtables to corresponding sub-processors;

in each of the plurality of sub-processors, receiving the divided first sub-tables from the plurality of sub-processors, merging the divided first sub-tables with the first join key so as to produce a local first main table, retrieving the second data in the recording means with the second join key equal to the first join key included in the local first main table, transferring the retrieved second data to the plurality of subprocessors;

in the each of the plurality of sub-processors, receiving the second data from plurality of the sub-processors, merging the received second data with the second join key so as to produce a local second main table, joining the first data in the received local first main table and the produced second data based on the first and second join key, producing a joined sub-table, and transferring the joined sub-table to the main processor;

in the main processor, receiving the joined sub-tables from each of the plurality of sub-processors, and merging the joined sub-tables with the first and second join key so as to produce the joined table.

* * * * *